US012152628B1

(12) United States Patent
Rice et al.

(10) Patent No.: US 12,152,628 B1
(45) Date of Patent: Nov. 26, 2024

(54) REVERSIBLE JOINING DEVICE AND METHOD

(71) Applicant: Cornerstone Research Group, Inc., Miamisburg, OH (US)

(72) Inventors: Jason Rice, Dayton, OH (US); Mark Cridge, Miamisburg, OH (US); Trang Young, Dayton, OH (US); Brian Pleiman, Dayton, OH (US); Kory Evanson, Vandalia, OH (US); Jason Hermiller, Lebanon, OH (US)

(73) Assignee: Cornerstone Research Group, Inc., Miamisburg, OH (US)

( * ) Notice: Subject to any disclaimer, the term of this patent is extended or adjusted under 35 U.S.C. 154(b) by 1091 days.

(21) Appl. No.: 17/061,653

(22) Filed: Oct. 2, 2020

Related U.S. Application Data

(60) Provisional application No. 62/909,869, filed on Oct. 3, 2019.

(51) Int. Cl.
*F16B 7/04* (2006.01)
*B64G 1/64* (2006.01)

(52) U.S. Cl.
CPC .............. *F16B 7/0413* (2013.01); *B64G 1/64* (2013.01); *F16B 2200/77* (2023.08)

(58) Field of Classification Search
CPC .... F16B 2200/77; F16B 7/0413; F16B 7/042; F16B 21/073; F16B 21/075; B29C 65/3644; B29C 66/12421; B64G 1/64
See application file for complete search history.

(56) References Cited

U.S. PATENT DOCUMENTS

| 4,450,616 | A |   | 5/1984 | Morita |   |
|---|---|---|---|---|---|
| 5,108,214 | A | * | 4/1992 | Milam | H01R 4/01 411/909 |
| 5,516,288 | A |   | 5/1996 | Sichler et al. |   |
| 5,722,709 | A | * | 3/1998 | Lortz | F03G 7/06 60/527 |
| 6,708,928 | B2 | * | 3/2004 | Telford | B64G 1/645 244/158.1 |
| 6,779,955 | B2 | * | 8/2004 | Rivin | B23B 31/006 267/141.1 |

(Continued)

FOREIGN PATENT DOCUMENTS

JP 2631131 B2 7/1997

*Primary Examiner* — Matthew R McMahon
(74) *Attorney, Agent, or Firm* — Dinsmore & Shohl LLP

(57) ABSTRACT

A reversible joint includes male and female components. The male component has a rigid stud with a shaft region and a head region having a greater width, than the shaft region. The female component includes a polymer-based bushing including a polymer sleeve and an embedded heating element. The polymer sleeve is formed from a shape memory polymer (SMP) or an SMP composite and includes a central channel. The polymer-based bushing is capable of being activated by heating with the embedded heating element to reversibly render the polymer sleeve elastic and allow deformation of the central channel to an expanded channel width during insertion of the head region. The polymer sleeve becomes rigid after deactivation of the polymer-based bushing for retention of the male component. Load bearing assemblies formed by connecting modular structures with the reversible joint are also provided along with installation tools for the same.

19 Claims, 17 Drawing Sheets

(56) References Cited

U.S. PATENT DOCUMENTS

| | | | |
|---|---|---|---|
| 7,610,783 B2* | 11/2009 | Rudduck | B62J 50/225 70/277 |
| 8,221,043 B2* | 7/2012 | Guyton | B29C 66/73715 411/432 |
| 9,483,891 B1 | 11/2016 | Feltham et al. | |
| 9,488,208 B2* | 11/2016 | Hemingway | F16B 37/04 |
| 9,664,211 B2* | 5/2017 | Tupper | B29C 66/474 |
| 10,407,896 B2 | 9/2019 | Merrifield | |
| 2010/0154181 A1 | 6/2010 | Flanigan et al. | |

* cited by examiner

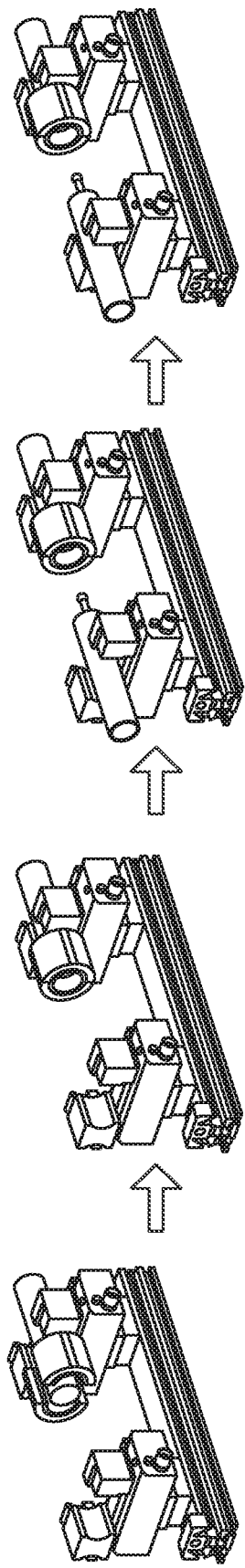
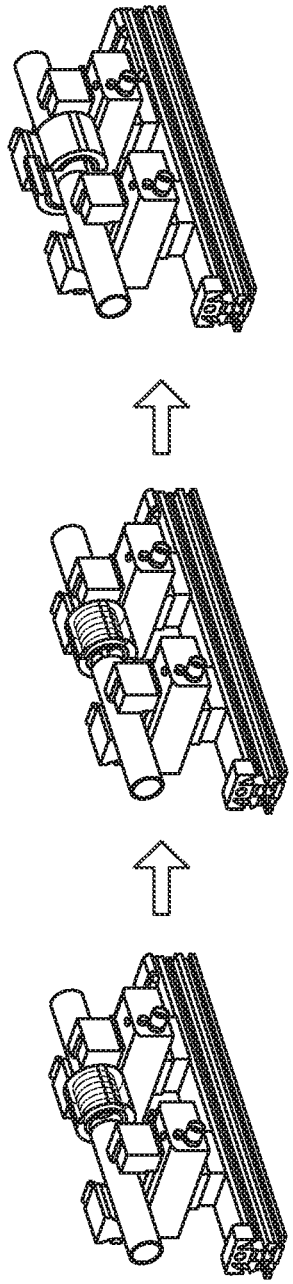
FIG. 10A  FIG. 10B  FIG. 10C  FIG. 10D  FIG. 10E  FIG. 10F  FIG. 10G

REVERSIBLE JOINING DEVICE AND METHOD

CROSS-REFERENCE TO RELATED APPLICATIONS

This application claims the benefit of U.S. Provisional Application Ser. No. 62/909,869, filed Oct. 3, 2019.

STATEMENT REGARDING FEDERALLY SPONSORED RESEARCH OR DEVELOPMENT

This invention was made with U.S. Government support under Contract No. NNX17CL54P, 80NSSC18C0058, 80NSSC19C0391, and 80NSSC20C0208 awarded by NASA to Cornerstone Research Group Inc. The U.S. Government has certain rights in the invention.

TECHNICAL FIELD

The present disclosure generally relates to reversible joints and installation tools for assembling structures comprising the same.

BACKGROUND

Reconfigurable and modular architectures for autonomous construction require the development of a strong and robust reversible mechanical connection. This connection should allow for repeatability of assembly and disassembly without mechanical degradation to provide reconfigurable substructures.

One key to the feasibility of autonomous assembly is the use of self-aligning and/or simple joining mechanisms given the operational constraints of autonomous assembly. Current mechanisms for deployable assembled structures include revolute joints, latches, welded or adhesively bonded joints, or electro-magnetic couplings. These mechanisms either have issues with micro-dynamic stability, are not reversible, or require constant power for activation. Self-aligning and/or simple joining mechanisms could be applied in the automotive industries such as in assembly of body panels to a body frame of an automobile, or in in-space assembly of solar arrays and modular (or aggregated) spacecraft components. However, for space solar arrays, joining structural trusses with connection nodes that can withstand axial loads up to 500 newtons (N) or greater are needed. Additionally, integrated electrical connections capable of carrying not only power but also data signals are needed to provide a scalable approach to assemble these structures.

Accordingly, there is a need for improved joining technology to allow for reversible and stable joints which are deployable throughout various environments and industries and capable of leveraging autonomous assembly.

SUMMARY

The present disclosure meets this need by providing reversible attachment joints, which not only provide additional capabilities such as integrated connections, but are also compatible with autonomous assembly techniques. The present disclosure provides a self-aligning reversible joint which utilizes shape memory polymer (SMP) composite structures to produce fasteners which when activated require significantly less force to assemble or disassemble than their designed load capacity. This commanded, repeatable, and drastic reduction in joint stiffness (e.g. SMP modulus) in the activated state allows for robust structures to be assembled using automated, robotic installation tools with limited output force and dexterity, which is especially advantageous for in-space assembly. To initiate the assembly, process each joint is coarsely positioned and "captured" by the assembly robot using alignment aids. Once the sub-assemblies are fully "captured", power is applied by the automated installation tool and the SMP composite material is activated and the fasteners are engaged. To "lock" the joint in place and to permit structural load transfer, power is removed and the SMP composite is returned to its inactive, stiff, high-strength state. Once the primary structural assembly is complete, the reversible joint enables the installation of electrical power, data, fluid, or thermal transfer connections to support system needs. In this way, large structures can be assembled autonomously while efficiently managing power resources.

Embodiments of the present disclosure relate to a reversible joint which comprises a male component and a female component. The male component comprises a rigid stud, the rigid stud comprising a shaft region having a first width and a head region having a second width, the second width being greater than the first width. Further, the female component comprises a polymer-based bushing, the polymer-based bushing comprising a polymer sleeve and an embedded heating element. The embedded heating element is an induction heating element or a resistive heating element. Additionally, the polymer sleeve comprises a shape memory polymer or a shape memory polymer composite material forming a central channel with a channel width less than the second width. The polymer-based bushing is capable of being activated by heating of the embedded heating element to reversibly change the polymer sleeve to become elastic to allow deformation of the central channel to an expanded channel width of at least the second width in an expanded region of the central channel during insertion of the head region of the male component therein. Further, the expanded region of the central channel returns to the channel width less than the second width upon passing of the head region of the male component through the expanded region and becomes rigid after deactivation of the polymer-based bushing for retention of the head region of the male component therein.

Embodiments of the present disclosure also relate to a load bearing assembly comprising modular structures where the modular structures include reversible joints configured to join the modular structures. The reversible joints comprise a male component and a female component with the male component disposed on a first modular structure and the female component disposed on a second modular structure in an orientation to allow connection of the first modular structure and the second modular structure in a reversible manner. The male component comprises a rigid stud, the rigid stud comprising a shaft region having a first width and a head region having a second width, the second width being greater than the first width. The female component comprises a polymer-based bushing, the polymer-based bushing comprising a polymer sleeve and an embedded heating element. The embedded heating element is an induction heating element or a resistive heating element. Further, the polymer sleeve comprises a shape memory polymer or a shape memory polymer composite material forming a central channel with a channel width less than the second width. The polymer-based bushing is capable of being activated by heating of the embedded heating element to reversibly change the polymer sleeve to become elastic to allow deformation of the central channel to an expanded channel width of at least the second width in an expanded region of the central channel during insertion of the head region of the male component therein. The expanded region of the central channel returns to the channel width less than the second width upon passing of the head region of the male component through the expanded region and becomes rigid after deactivation of the polymer-based bushing for retention of the head region of the male component therein.

Embodiments of the present disclosure also relate to an installation tool for assembling a load bearing assembly comprising modular trusses. The modular trusses include reversible joints configured to join the modular trusses, the reversible joints comprising a male component and a female component with the male component disposed on a first modular truss and the female component disposed on a second modular truss in an orientation to allow connection of the first modular truss and the second modular truss in a reversible manner. The male component comprises a rigid stud, the rigid stud comprising a shaft region having a first width and a head region having a second width, the second width being greater than the first width. The female component comprises a polymer-based bushing, the polymer-based bushing comprising a polymer sleeve and an embedded heating element. The embedded heating element is an induction heating element. The polymer sleeve comprises a shape memory polymer or a shape memory polymer composite material forming a central channel with a channel width less than the second width. Further, the polymer-based bushing is capable of being activated by heating of the embedded heating element to reversibly change the polymer sleeve to become elastic to allow deformation of the central channel to an expanded channel width of at least the second width in an expanded region of the central channel during insertion of the head region of the male component therein. Additionally, the expanded region of the central channel returns to the channel width less than the second width upon passing of the head region of the male component through the expanded region and becomes rigid after deactivation of the polymer-based bushing for retention of the head region of the male component therein. The installation tool in particular comprises a first gripper configured to capture the first modular truss, a second gripper configured to capture the second modular truss, an induction coil operable to power the embedded heating element, and a motorized actuator configured to controllably insert the rigid stud of the male component into the polymer based bushing of the female component.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIGS. 10A-10G schematically depict the process of connection of two components with the registerable joint, according to one or more embodiments shown or described herein;

DETAILED DESCRIPTION

Embodiments of the present disclosure generally relate to reversible joints, load bearing assemblies formed from modular structures comprising the reversible joints, and installation tools for assembling the load bearing assemblies. Specifically, reversible joints capable of reversible alignment, capture, and locking are disclosed here to facilitate reliable assembly of modular structure into larger assemblies in a controlled and repeatable manner. Current assembly of structures in space and in orbit around earth is accomplished using extra-vehicular activity performed by astronauts and requires complex motion of mechanical joints. Reversible joints of the present disclosure and the associated structures and assembly systems are tolerant to misalignment and permit capture of two components over multiple cycles easing the burden in assembly.

Figure 1A:
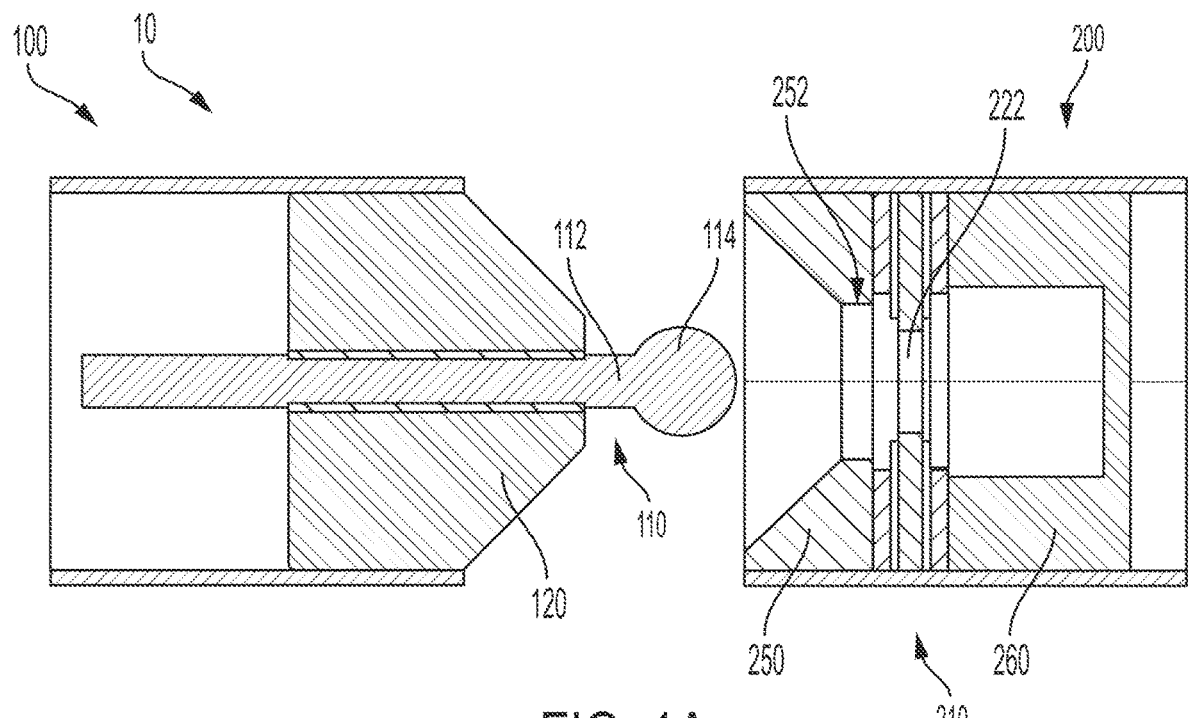
FIG. 1A schematically depicts a reversible joint in the alignment phase, according to one or more embodiments shown or described herein.
Figure 1B:
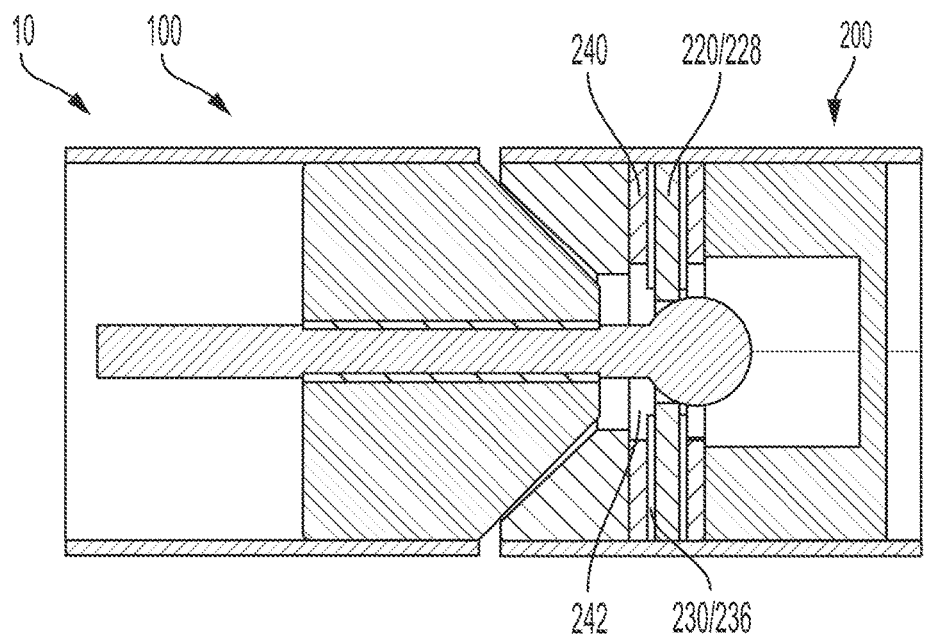
FIG. 1B schematically depicts the reversible joint of FIG. 1A in the locked phase, according to one or more embodiments shown or described herein.
Figure 2A:
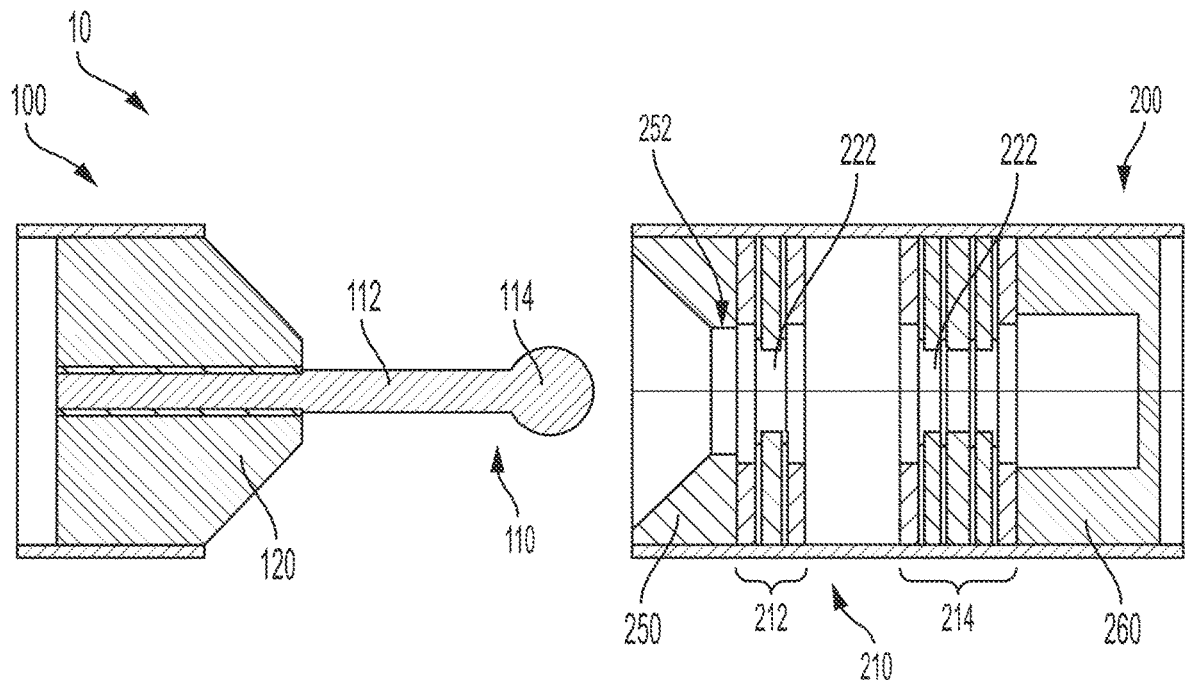
FIG. 2A schematically depicts a reversible joint in the alignment phase, according to one or more embodiments shown or described herein.
Figure 2B:
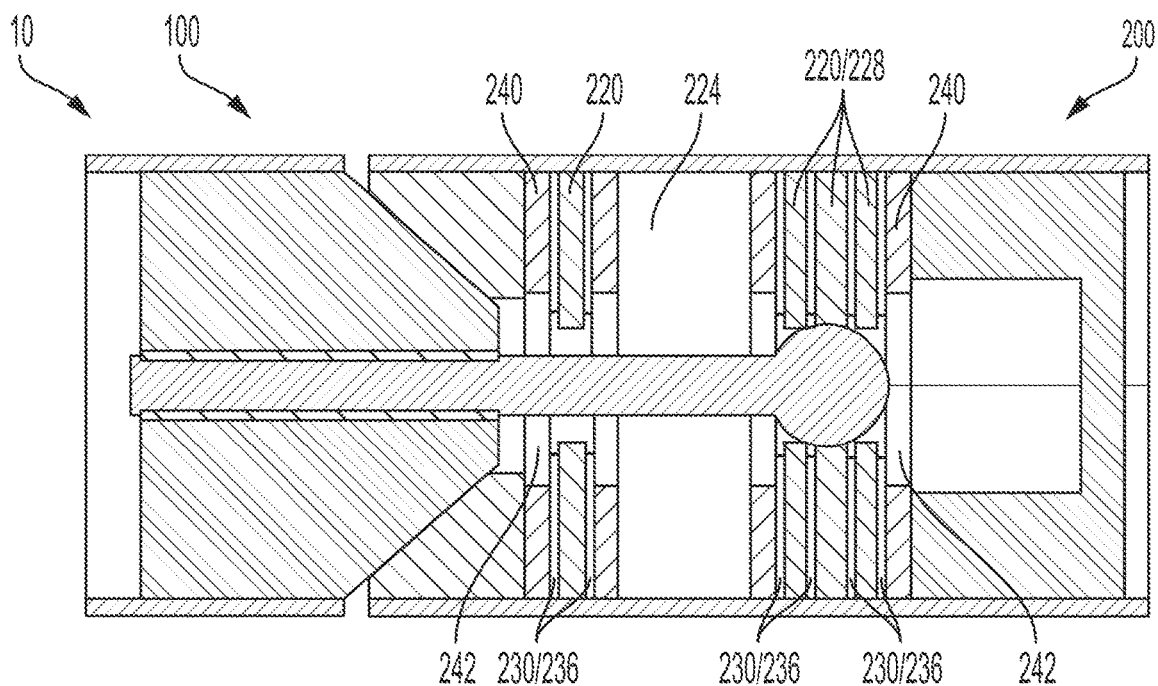
FIG. 2B schematically depicts the reversible joint of FIG. 2A in the locked phase, according to one or more embodiments shown or described herein.
Figure 3A:
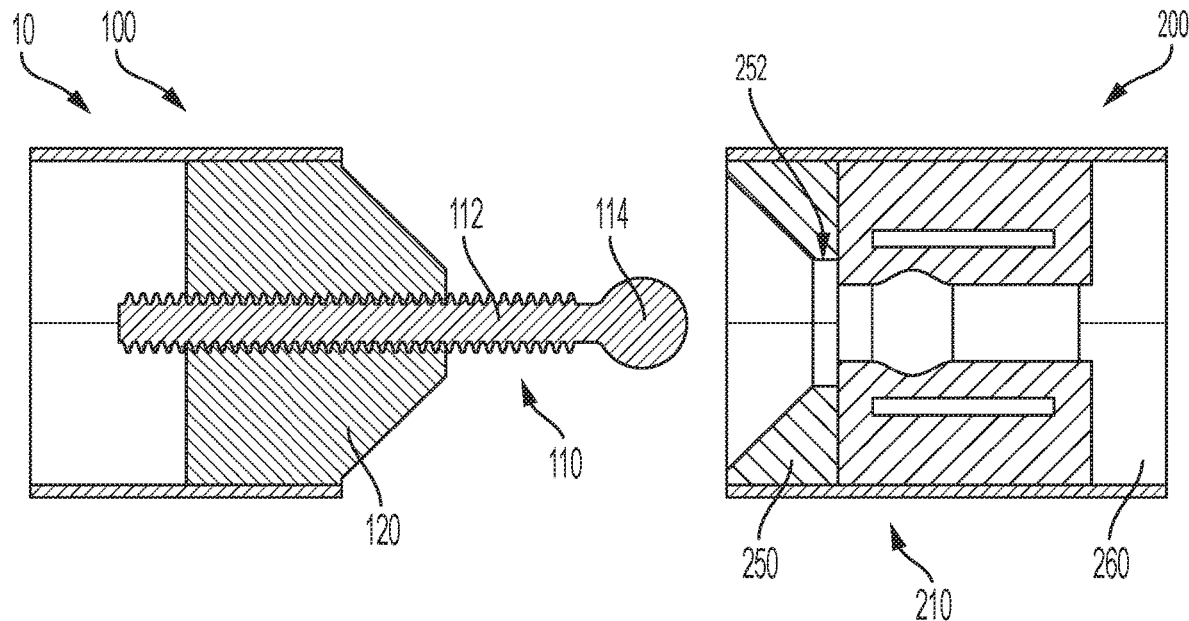
FIG. 3A schematically depicts a reversible joint in the alignment phase, according to one or more embodiments shown or described herein.
Figure 3B:
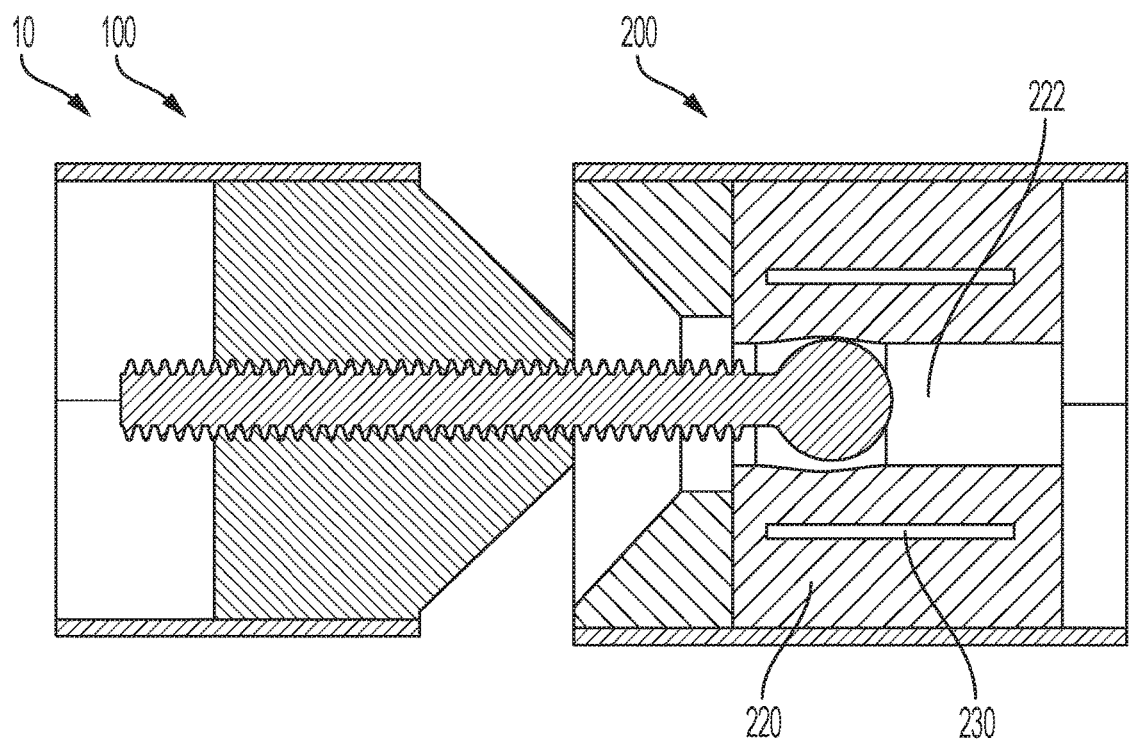
FIG. 3B schematically depicts the reversible joint of FIG. 3A in the captured phase, according to one or more embodiments shown or described herein.
Figure 3C:
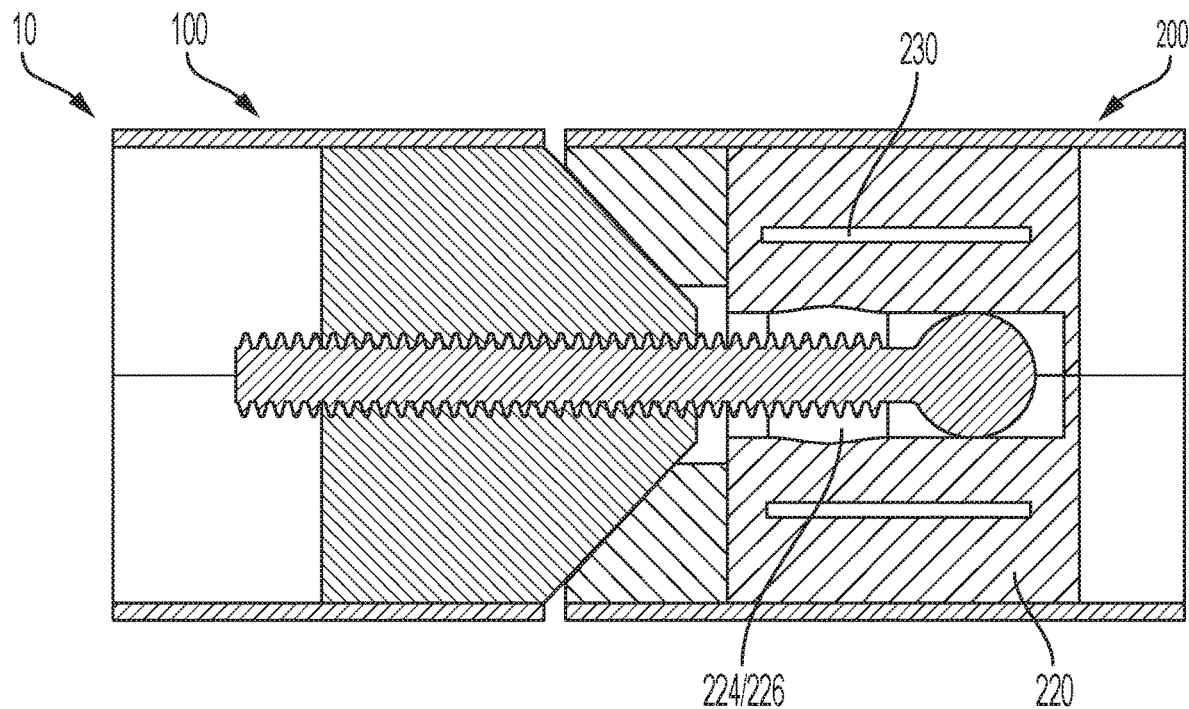
FIG. 3C schematically depicts the reversible joint of FIGS. 3A and 3B in the locked phase, according to one or more embodiments shown or described herein.

With reference to FIGS. 1, 2 and 3, the reversible joints presently disclosed include a male component 100 and a female component 200, the female component 200 formed from a shape memory polymer and includes an embedded heating element to change the mechanical properties of the shape memory polymer to allow a reversible mating of the male and female components. Further details of embodiments of the reversible joint, application of the reversible joint in load bearing assemblies, and systems for assembling the same are provided throughout the present disclosure.

In accordance with embodiments of a reversible joint, the reversible joint 10 comprises a male component 100 and a female component 200. The male component 100 comprises a rigid stud 110 and the female component 200 comprises a polymer-based bushing 210 for engagement with the rigid stud 110. The rigid stud 110 comprises a shaft region 112 having a first width and a head region 114 having a second width, the second width being greater than the first width. Further, the polymer-based bushing 210 comprises a polymer sleeve 220 and an embedded heating element 230. In various embodiments, the embedded heating element made operate on the principles of induction or resistive heating. The polymer sleeve 220 is formed from a shape memory polymer or a shape memory polymer composite material and includes a central channel 222 with a channel width less than the second width. The polymer-based bushing 210 is capable of being activated by heating of the embedded heating element 230 to reversibly change the polymer sleeve 220 to become elastic. The heating of the polymer-based bushing 210 allows for deformation of the central channel 222 during insertion of the head region 114 of the male component 100 therein. The central channel 222 is deformed to an expanded channel width of at least the second width in an expanded region of the central channel 222 during the insertion process. The expanded region of the central channel returns to the channel width less than the second width upon passing of the head region 114 of the male component 100 through the expanded region and becomes rigid after deactivation of the polymer-based bushing 210 for retention of the head region 114 of the male component 100 therein. Each of the components of the reversible joint 10 are discussed in greater detail in the various embodiments disclosed throughout the present disclosure.

The male component 100 includes a rigid stud 110 having a shaft region 112 with a first width and a head region 114 with a second width, the second width being greater than the first width. The head region 114 comprising a width greater than the width of the shaft region 112 allows for the head region 114 to be captured within the female component 200. In one or more embodiments, the head region 114 of the rigid stud 110 may comprise a curved geometry. The curved geometry of the head region 114 assists in aligning the male component 100 and the female component 200 during capture or assembly operations. The curved geometry of the head region 114 additionally minimizes or eliminates sharp edges or corners which may damage or mar the interfacing parts of the female component 200 resulting in potential failure or weakening of the connection.

In various embodiments, the head region 114 of the rigid stud 110 may comprise a curved geometry which is non-spherical or spherical. Examples of non-spherical head regions may include a spheroid of either an oblate or prolate shape or a spherocylinder representing a three-dimensional geometric shape consisting of a cylinder with hemispherical ends. It will be appreciated that a spherocylinder may be formed from various types of cylinders including an elliptic cylinder or a circular cylinder. Further, the non-spherical head regions may be aligned with the shaft region in any orientation to adjust the profile of the head region 114 which engages with the female component 200. For example, a head region 114 comprising a substantially spheroid geometry may be affixed to the shaft region 112 such that the axis of rotation forming the spheroid is aligned with a longitudinal axis of the shaft region 112 or affixed to the shaft region 112 such that the axis of rotation forming the spheroid is perpendicular with a longitudinal axis of the shaft region 112.

In various embodiments, the rigid stud 110 is formed from metal, ceramic, polymer, or a composite material. It will be appreciated that in one or more embodiments, the material forming the head region 114 and the material forming the shaft region 112 may be the same. In further embodiments, the material forming the head region 114 and the material forming the shaft region 112 may be different to capture the mechanical and material properties desired for each region. Example metal materials which may be utilized to form the rigid stud 110 include steel, aluminum, titanium, and various alloys. Utilization of aluminum provides a benefit of low density compared to other metals allowing for lighter weight components. Additionally, polymer composites such as composites made with epoxy, cyanate ester, high temperature thermoplastic such as polyether ether ketone (PEEK), polyetherimide (PEI), nylon, or polycarbonate may also be utilized to form the rigid stud 110. Examples of additional composites which may be utilized for the rigid stud 110 include carbon fiber, or glass fiber (aramid fiber, polymer fiber) reinforced composite made with epoxy or cyanate ester polymers, as well as polymer composite with particulate fillers such as carbon, silica, silicon carbide.

With continued reference to FIGS. 1, 2, and 3, the female component 200 comprises a polymer-based bushing 210 formed from a polymer sleeve 220 with an embedded heating element 230. In various embodiments, the polymer sleeve 220 comprises a shape memory polymer or a shape memory polymer composite material and comprises a central channel 222. The central channel 222 is sized and configured to allow passage of the rigid stud 110 when the material of the polymer sleeve 220 is in an activated state and to engage and secure the rigid stud 110 when in a deactivated state.

In one or more embodiments, the polymer sleeve 220 may comprise a hollow cylinder of the shape memory polymer or the shape memory polymer composite material with the central channel 222 disposed along a central axis. In one or more embodiments, the polymer sleeve 220 additionally comprises one or more enlarged regions 224 of the central channel 222 sized to accept the head region 114 of the rigid stud 110 without deformation of the polymer sleeve 220. The enlarged region 224 may be positioned at one or more locations along the central channel 222. The enlarged region 224 of the central channel 222 allows the head region 114 of the rigid stud 110 to be captured by the polymer sleeve 220 while allowing limited movement between the male component 100 and the female component 200 of the reversible joint 10. For example, the enlarged region 224 may trap the head region 114 such that the head region 114 is incapable of backing out of the polymer sleeve 220, but allows the male component 100 to retain freedom or clearance to move or rotate in order for other reversible joints 10 to position themselves for full engagement of an assembly of multiple components.

In one or more embodiments and with particular reference to FIG. 3, the enlarged region 224 may comprise a groove 226 recessed into the central channel 222 of the polymer sleeve 220. Such groove 226 may be provided with a depth and geometry selected based on the desired freedom of movement between the male component 100 and female component 200 in the captured phase. For example, the magnitude of rotational movement may be limited with an elliptical head region 114 and a groove 226 having a varying depth such that the head region 114 and the polymer sleeve 220 are incapable of complete rotational freedom without engagement. Similarly, the size, positioning, or both of the groove 226 may determine the extent of lateral and translational movement of the rigid stud 110 possible while in a capture phase in the enlarged region 224.

In one or more embodiments, the embedded heating element 230 is disposed within the polymer sleeve 220 such that the polymer sleeve 220 encapsulates the embedded heating element 230.

The embedded heating element 230, in at least embodiments where the embedded heating element 230 is based on the principles of induction heating, is formed from a material which is a susceptor. One skilled in the art appreciates that a susceptor is a material used for its ability to absorb electromagnetic energy and convert it to heat. In one or more embodiments, the embedded heating element 230 comprises a sheet of a conductive, ferromagnetic, or ferrimagnetic material encircling the central channel 222. The embedded heating element 230 comprises a geometry such that the conductive, ferromagnetic, or ferrimagnetic material is capable of distributing heat throughout the polymer sleeve 220 to activate the shape memory polymer or the shape memory polymer composite material forming the polymer sleeve 220. In one or more particular embodiments and with reference to FIG. 4, the sheet of the conductive, ferromagnetic, or ferrimagnetic material forms a central ring 232 with a plurality of arms 234 extending from the central ring 232 along a longitudinal length of the polymer sleeve 220. In various further embodiments, the sheet of the conductive, ferromagnetic, or ferrimagnetic material may form multiple central rings with connections therebetween, a plurality of separate bands or rings, or other arrangement positioning the conductive, ferromagnetic, or ferrimagnetic material proximal the entirety of the polymer sleeve 220.

Figure 4:
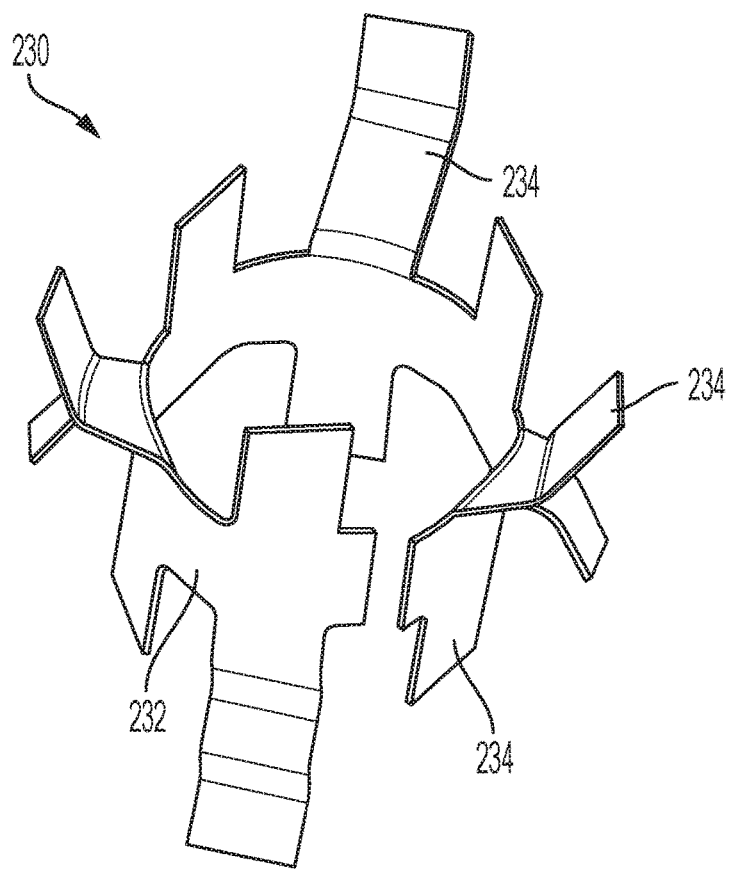
FIG. 4 schematically depicts an embedded heating element, according to one or more embodiments shown or described herein.

It will be appreciated that an effective susceptor should be designed to penetrate and intercept a high percentage of the magnetic flux generated by an induction coil. Therefore, the shape of the susceptor should correlate with the shape of the induction coil and the produced field lines. For example a helical spiral induction coil produces largely axial flux lines down the center of the spiral axis. In this case a round disc filling the inner diameter of the spiral would penetrate a high percentage of the magnetic flux field lines and heat rapidly. However, for the reversible joint 10 additional susceptor design constraints must be accounted for including: large, distributed surface area for optimal heat transfer throughout the volume of the reversible joint 10 and minimal impact to joint strain potential to avoid structures which trap or bind movement of the polymer sleeve 220. As such, the "crown" geometry of the embedded heating element 230 as generally illustrated in FIG. 4 was specifically designed to intercept multiple lines of flux, concentrate heating near the high-strain regions of the polymer sleeve 220, and include slits or gaps to allow for strain. It will be appreciated that one factor that determines how quickly the susceptor absorbs magnetic flux is its surface area with respect to the inner diameter of the induction coil. Regardless of what shape the induction coil may be, the heat susceptor must be cover a large enough area around the induction coil to ensure the maximum amount of magnetic flux is absorbed by the susceptor (embedded heating element 230 operating on the principles of induction heating).

With reference to FIGS. 1 and 2, the polymer-based bushing 210 may be formed from a series of stacked annular components. In one or more embodiments, the polymer sleeve 220 of the polymer-based bushing 210 may comprise one or more annular cylinders or prisms 228 comprising the shape memory polymer or the shape memory polymer composite material to form the polymer sleeve 220. While the term annular cylinder implies a geometry with a circular or oval profile and annular prism implies a polygonal geometry, it will be understood that the outer profile of the polymer-based bushing 210 and more specifically the polymer sleeve 220 may be of any profile and is expressly not-limited to a circular, oval, or polygonal profile. It will be appreciated that the annulus formed within the annular cylinders or prisms 228 forms the central channel 222 of the polymer sleeve. For example, the polymer sleeve 220 may be formed from a series of washers of various thicknesses which in an activated state may have the central hole of the washer enlarged to allow passage of the head region 114 of the rigid stud 110. Further, upon final positioning of the head region 114, the annular cylinders or prisms 228 forming the polymer sleeve 220 may be deactivated to return the annular cylinders or prisms 228 to a rigid state to secure and capture the rigid stud 110. In one or more embodiments and with reference to FIG. 1, the head region 114 of the rigid stud 110 may be passed beyond the annular cylinder or prism 228 such that the annular cylinder or prisms 228 serves as a backstop to prevent withdrawal of the head region 114. In one or more further embodiments and with reference to FIG. 2, the head region 114 of the rigid stud 110 may be aligned with the annulus of one or more of the annular cylinders or prisms 228 to capture the head region 114 by enveloping the contours of the head region 114 to prevent withdrawal of the head region 114.

In one or more embodiments, the embedded heating element 230 comprises one or more annular plates 236 comprising conductive, ferromagnetic, or ferrimagnetic material. The annular plates 236 may be positioned adjacent to one or more faces of each of the annular cylinders or prisms 228 of the polymer sleeve 220. In addition, the annular plates 236 may be connected with electrically conductive wires to a power source for applying resistive heating. The annular plates 236 may also be encapsulated by the shape memory polymer within the polymer sleeve 220. It will be appreciated that the annular plates 236 forming the embedded heating element 230 may comprise an annular plate aperture aligned with the central channel 222 of the polymer sleeve 220 and sized to allow free passage of the rigid stud 110 therethrough. It will be understood that the outer profile of the annular plates 236 may be of any profile and is expressly not-limited to a circular, oval, or polygonal outer profile. The annular plates 236 when subjected to a magnetic field are heated and the proximity to the annular cylinders or prisms 228 of the polymer sleeve 220 results in heating and activation of the polymer sleeve 220.

In one or more embodiments, the female component 200 further comprises one or more insulation rings 240 positioned adjacent a front face, a back face, or both the front and the back face of the polymer-based bushing 210. The insulation rings 240 are configured to reduce transmission of heat generated by the embedded heating element 230 away from the polymer-based bushing 210. Specifically, the insulation rings 240 provide a thermal barrier to direct heat generated by the embedded heating element 230 toward the polymer sleeve 220 to aid in activation of the shape memory polymer or the shape memory polymer composite material. The insulation rings 240 include an insulation ring aperture 242 which may be aligned with the central channel 222 of the polymer sleeve 220. Further, the insulation ring aperture 242 may be sized to allow free passage of the rigid stud 110 therethrough. In one or more embodiments, the insulation rings 240 may be formed from silica aerogel mat.

In one or more embodiments and with reference to FIG. 2, the polymer based bushing 210 may comprise a split configuration with a first bushing 212 comprising the one or more annular cylinders or prisms 228 and the one or more annular plates 236 in a sandwiched configuration and a second bushing 214 comprising additional instances of the one or more annular cylinders or prisms 228 and the one or more annular plates 236 in a sandwiched configuration. In such configuration, the first bushing 212 and the second bushing 214 are spaced apart with a gap provided between the bushings that is sized to allow the head region 114 of the rigid stud 110 to be captured between the first bushing 212 and the second bushing 214. The split configuration allows the head region 114 of the rigid stud 110 to be passed beyond the first bushing 212 and held in a captured phase. The captured phase allows relative motion between the male component 100 and the female component 200, but does not allow the male component 100 to be fully removed from the female component 200. This arrangement is beneficial in allowing instances of the reversible joint 10 in an assembly having a plurality of the reversible joints 10 to be preliminarily joined in a captured phase while additional instances of the reversible joint 10 are aligned and preliminarily joined.

In one or more embodiments, the embedded heating element 230 operates on the principles of induction heating and comprises ferromagnetic or ferrimagnetic materials having a Curie temperature which is greater than the activation temperature of the shape memory polymer or the shape memory polymer composite material forming the polymer sleeve 220. In various embodiments, the ferromagnetic or ferrimagnetic materials forming the embedded heating element 230 have a Curie temperature which is 80 to 180° C., 90 to 150° C., or 110 to 130° C. greater than the activation temperature of the shape memory polymer or the shape memory polymer composite material forming the polymer sleeve 220. It will be appreciated that the use of an alloy for the embedded heating element 230 with a Curie temperature matching the activation temperature of the polymer sleeve 220 allows the alloy to be inductively heated to activate the shape memory polymer composite material forming the polymer sleeve 220, but prevents over heating of the polymer sleeve 220. One skilled in the art understands that the Curie temperature, or Curie point, is the temperature above which certain materials lose their permanent magnetic properties. Specifically, when the alloy is heated up to the Curie temperature, the material switches from ferromagnetic or ferrimagnetic to paramagnetic, which stops the inductive heating mechanism and prevents further heating to a point where the polymer sleeve 220 may be damaged or excessively heated. Such mechanism utilizes the natural Curie temperature inherent within each material.

In various embodiments, the embedded heating element 230 may comprise ferromagnetic or ferrimagnetic materials. Examples of ferromagnetic materials include iron, cobalt, nickel, steel, stainless steel, as well as rare earth alloys such as gadolinium, dysprosium, samarium and neodymium. Examples of ferromagnetic materials include magnetite as well as dual oxides formed with iron and another metal. Examples of especially desirable materials for construction of the embedded heating element 230 based on their Curie points include alloys of iron, nickel, cobalt, and manganese zinc.

In one or more embodiments, the polymer sleeve 220 comprises a shape memory polymer or shape memory polymer composite material. As understood by one skilled in the art, a shape memory polymer is a polymeric smart material that has the ability to return from a temporary deformed state to its original shape with activation by an external stimulus such as temperature change. In the context of the present disclosure, such shape memory polymers allow for the polymer sleeve 220 to be deformed for passage of the head region 114 of the rigid stud 110 upon activation of the shape memory polymer with application of heat. As the shape memory polymer remains in an activated state during passage of the head region 114 of the rigid stud 110 any deformation of the polymer sleeve 220 is reversed after passage of the head region 114 past each respective section of the polymer sleeve 220. Subsequently, and upon deactivation of the polymer sleeve 220 from cooling of the shape memory polymer, the polymer sleeve 220 regains rigidity and a geometry matching its original shape in any area not actively being deformed.

In one or more embodiments, the polymer sleeve 220 comprises a shape memory polymer. Examples of shape memory polymers suitable for utilization in the present disclosure include epoxy, cyanate ester, polyurethane, polyacrylate, or vinyl shape memory polymers.

In one or more embodiments, the polymer sleeve 220 comprises a shape memory polymer composite material. A shape memory polymer composite material comprises a shape memory polymer and an additional reinforcing material. Examples of reinforcing materials which may be used in combination with the previously disclosed shape memory polymers include carbon fiber, fiberglass, aramid fiber, polymer fiber, felt material, carbon felt, random fiber mats, scrims, chopped fibers, fiber knits, unidirectional fiber plies, three-dimensional fiber weaves, three-dimensional fiber preforms, non-crimp discontinuous carbon fiber, plain weave fabrics, twill fabrics, harness satin fabrics or combinations thereof.

In one or more embodiments, the shape memory polymer composite material comprises a shape memory polymer and carbon fiber. The carbon fiber component of the shape memory polymer composite material may be in various forms. For example, the carbon fiber may comprise a chopped carbon fiber having a weighted average length of 5 to 20 millimeters (mm) or a nonwoven carbon fiber mat. Alternatively or additionally, the carbon fiber may comprise a non-crimp discontinuous carbon fiber.

In one or more embodiments, the female component 200 additionally includes a docking receptacle 250 adjacent the polymer-based bushing 210. The docking receptacle 250 allows for increased tolerance in the initial alignment of the male component 100 and the female component 200 when assembling the reversible joint 10. Specifically, the docking receptacle 250 provides a target of increased cross-section relative to the cross-section of the central channel 222 of the polymer sleeve 220 and as such guides the rigid stud 110 into the central channel 222 of the polymer sleeve 220. The docking receptacle 250 generally comprises a central alignment aperture 252 aligned with the central channel 222 of the polymer sleeve 220. The central alignment aperture 252 may be sized to allow free passage of the rigid stud 110. Additionally, in one or more embodiments, the docking receptacle 250 may further include a beveled face such that the alignment aperture 252 comprises a progressive reduction in cross-sectional area from a leading edge of the docking receptacle 250 to a trailing edge adjacent the polymer-based bushing 210.

In one or more embodiments, the male component 100 additionally includes a docking collar 120 positioned on or adjacent the shaft region 112 of the rigid stud 110. The docking collar 120 may comprise a leading face having an inverse geometry to the beveled face of the docking receptacle 250. As such, when the reversible joint 10 is in a locked phase with the male component 100 fully seated with the female component 200, the docking receptacle 250 and the docking collar 120 provide stability to the reversible joint 10. Further, the interface of the docking receptacle 250 and the docking collar 120 allows for load transfer between the male component 100 and the female component 200 to shed bending load and stress away from the shaft region 112 of the rigid stud 110.

In one or more embodiments, the female component 200 additionally includes a retaining ring 260 positioned beyond the polymer-based bushing 210 to prevent forward movement of the polymer-based bushing 210 during insertion of the rigid stud 110 into the polymer sleeve 220. In effect the polymer-based bushing 210 is secured between the docking receptacle 250 and the retaining ring 260.

In one or more embodiments, the docking receptacle 250 and the retaining ring 260 may be formed from a low thermal conductivity plastic. Examples of low thermal conductivity plastics include polycarbonate, polyacrylate, and syntactic. The low thermal conductivity allows the docking receptacle 250, the retaining ring 260, or both to provide additional insulative properties to augment the insulation rings 240.

In one or more embodiments, the female component 200 additionally a spring-loaded pin electrical connector, such as a pogo pin connector, housed in the retaining ring 260. The spring-loaded pin electrical connector may be positioned at the rear of the retaining ring 260 to provide indication that the reversible joint 10 is fully engaged and locked. Specifically, the engagement status of the reversible joint 10 may be verified through checking whether electrical continuity has been established with the spring-loaded pin electrical connector.

Figure 5:
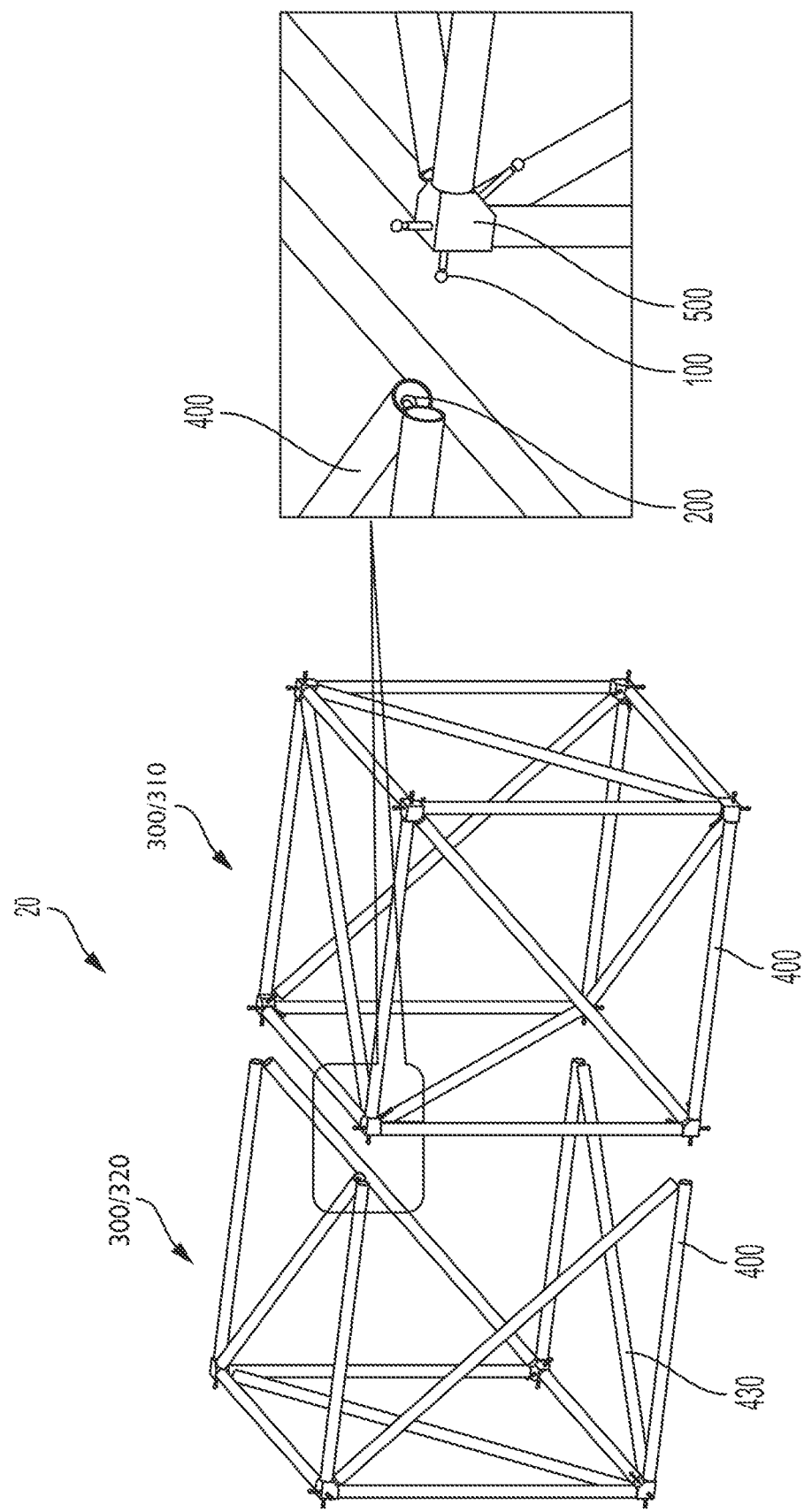
FIG. 5 schematically depicts a modular structure comprising trusses, according to one or more embodiments shown or described herein.

Having described embodiments of the reversible joint, attention is drawn to disclosure of load bearing assemblies 20 comprising modular structures 300, the modular structures 300 comprising one or more of the reversible joints 10 of the present disclosure. With reference to FIG. 5, the reversible joints 10 are configured to join the modular structures 300 to form the load bearing assembly 20. As previously indicated, the reversible joints 10 comprise a male component 100 and a female component 200. In one or more embodiments, the male component 100 is disposed on a first modular structure 310 and the female component 200 is disposed on a second modular structure 320 in an orientation to allow connection of the first modular structure 310 and the second modular structure 320 in a reversible manner.

In one or more embodiments, the modular structures 300 may comprise trusses. For example and with reference to FIGS. 5, 6A, and 6B, a cubic truss structure may be fabricated using tubing sections 400 and hardware to form connection nodes 500 between the tubing sections 400. A basic cubic truss structure may be formed by securing a threaded bushing 410 into both ends of the tubing 400 and subsequently attaching the tubing sections 400 to the connection nodes 500 with threaded studs 420. The system of tubing sections 400 and connection nodes 500 allows truss structures of various sizes and configurations to be preassembled. The connection nodes 500 may also be directly secured into the ends of the tubing 400 in lieu of connection with the threaded bushing 410 and threaded studs 420.

It will be appreciated that the tubing sections 400 and the connection nodes 500 may be formed from any material of suitable chemical and mechanical properties anticipated during service of the modular structure. For example, in various embodiments, the tubing sections 400 may comprise carbon fiber, a polymeric composite, or a metal alloy. Similarly, in various embodiments, the connection nodes 500 may comprise carbon fiber, a polymeric composite, or a metal alloy such as an aluminum alloy.

The form of connection between the tubing sections 400 and the connection nodes 500 or threaded bushings 410 may be selected based on the specific materials forming each. In various embodiments, the connection may comprise an adhesive bond, a threaded connection, or a compression/friction fit. Example adhesives which may be utilized include epoxy, acrylic, cyanoacrylate, and polyurethane adhesives.

In one or more embodiments, diagonal stiffening elements 430 may be secured to the tubing sections 400 forming primary elements of the truss. The diagonal stiffing elements 430 may be secured to the tubing sections 400 using clamping brackets, for example. It will be appreciated that the diagonal stiffening elements 430 may be formed from tubing of a similar or same material as the tubing sections 400 or may comprise an alternate construction.

Figure 6A:
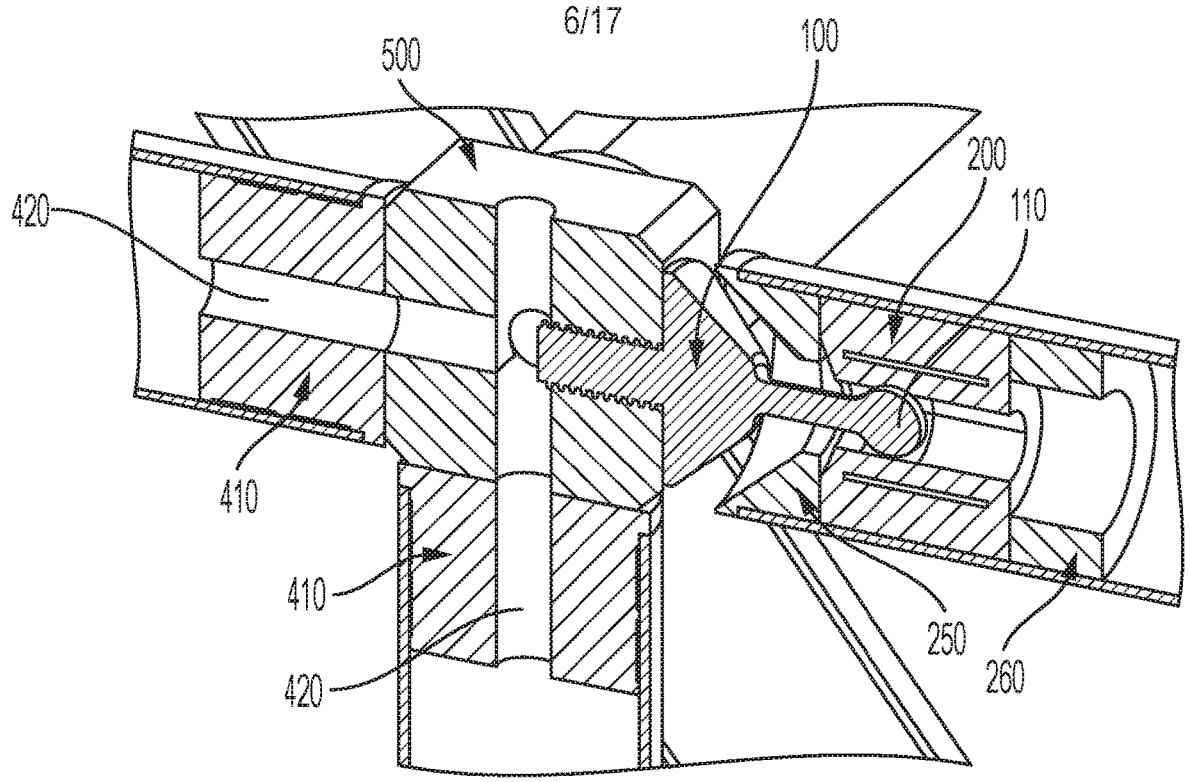
FIG. 6A schematically depicts a reversible joint in the capture phase connecting a tubing section and a connection node, according to one or more embodiments shown or described herein.
Figure 6B:
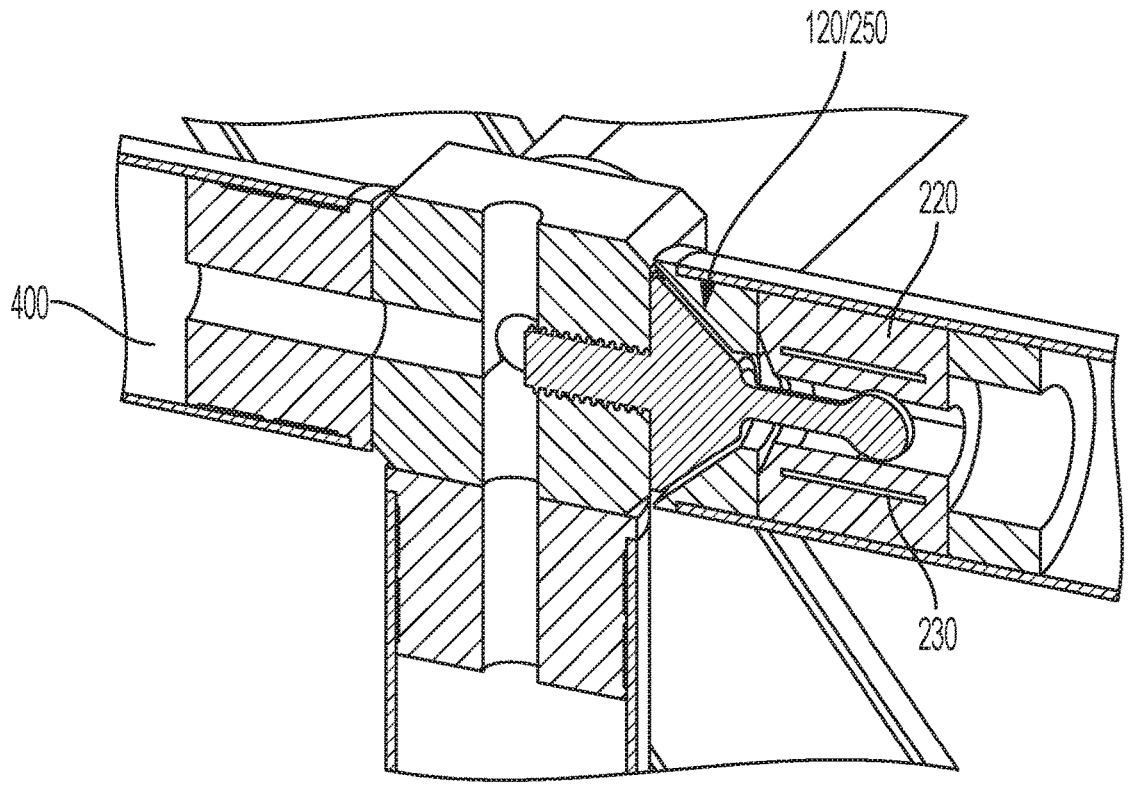
FIG. 6B schematically depicts the reversible joint of FIG. 6A in the locked phase connecting a tubing section and a connection node, according to one or more embodiments shown or described herein.

The reversible joints 10 of the present disclosure may be utilized in the assembly of the trusses as well as modular structures 300 comprising a plurality of trusses. In one or more embodiments, the reversible joints 10 of the present disclosure may be utilized in the connection of the tubing sections 400 and the connection nodes 500 as illustrated in FIGS. 6A and 6B. Specifically, the male component 100 may be disposed on the connection node 500 and the female component 200 may be disposed at the end of the tubing section 400 allowing for reversible connection of the two elements. It will be appreciated that the positions of the male and female components 100/200 may be reversed with the female component 200 included as part of the connection node 500 and the male component 100 disposed at the end of the tubing section 400. The reversible joint 10 may also be utilized for only a portion of the connections forming the truss. Specifically, the threaded, compression, or adhesive connections between the tubing sections 400 and connection node 500 may be utilized for a portion of the connections to form pre-assemblies with the reversible joints 10 utilized for connecting multiple pre-assemblies together. Further, the reversible joints 10 may also be utilized to directly connect two tubing sections 400 without an intervening connection node 500 to create a single tubing section 400 of greater length.

Figure 7:
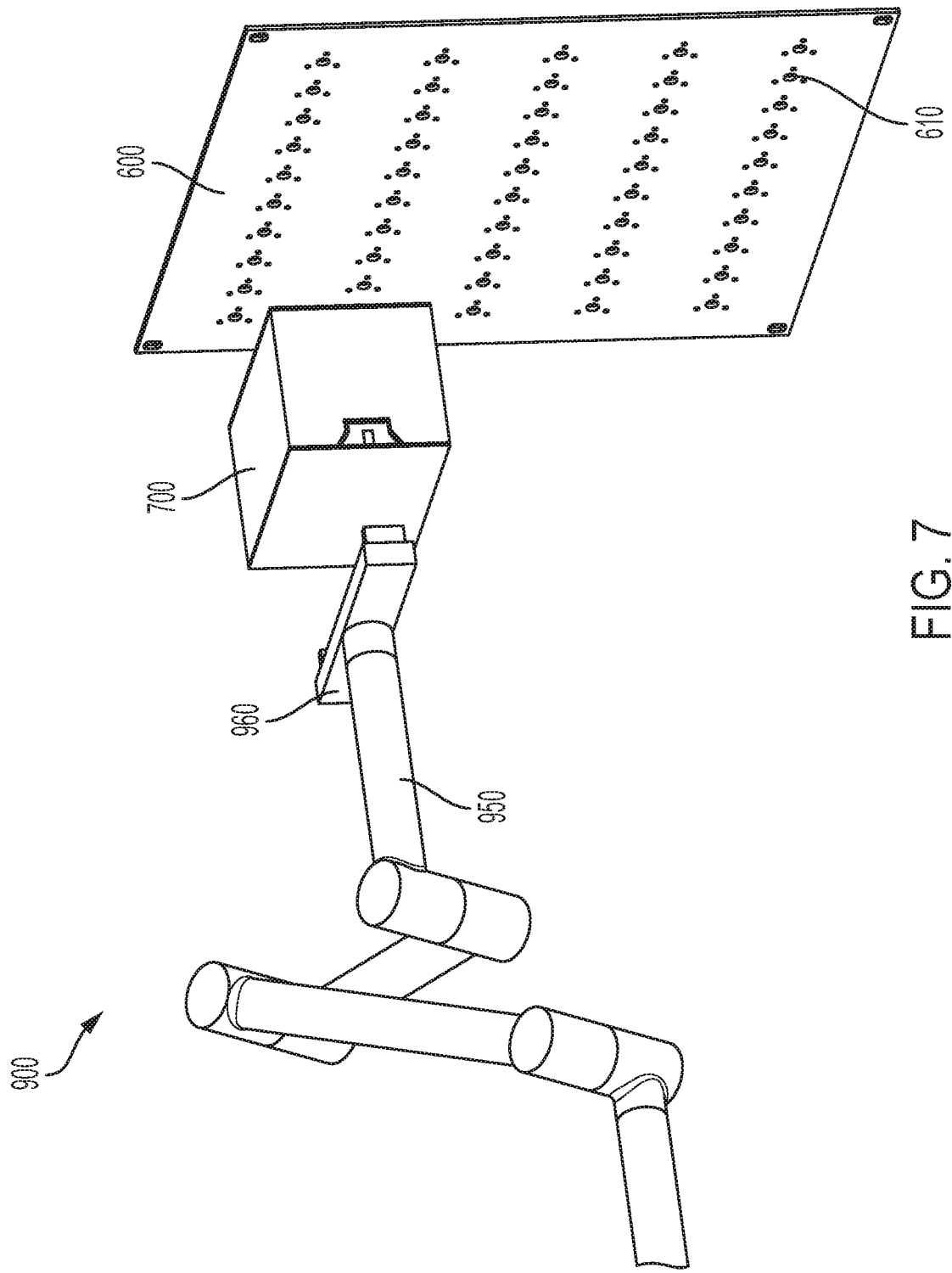
FIG. 7 schematically depicts installation of a payload to a pallet, according to one or more embodiments shown or described herein.
Figure 13:
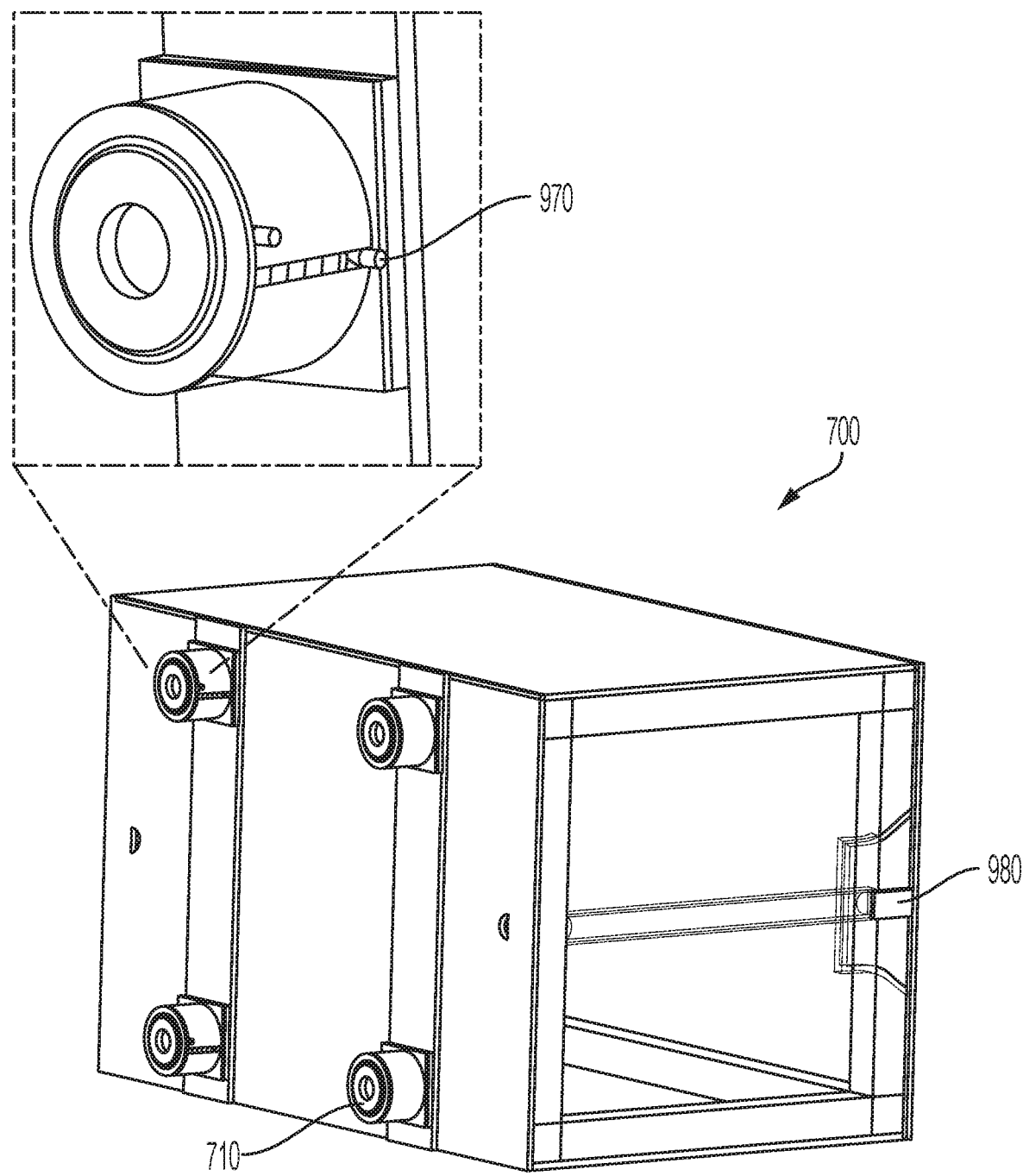
FIG. 13 schematically depicts a payload with a static induction coil, according to one or more embodiments shown or described herein.

In one or more embodiments and with reference to FIGS. 7 and 13, the modular structures 300 may comprise a pallet 600 with a plurality of predefined connection points 610 for affixing one or more payloads 700. The pallet 600 may comprise a rigid panel securely mounted to a base structure, the pallet 600 then provides a secured platform for attachment of payloads 700 to the base structure. For example, the pallet 600 may comprise a grid of connection points 610 providing a multitude of alternate locations for affixing mounting points 710 of a payload 700 to the pallet 600.

In one or more embodiments, the connection points 610 disposed on the pallet 600 may comprise a rigid stud 110 in accordance with the male component 100 of the reversible joints 10 of the present disclosure. In such embodiments, the payload 700 which is configured to be reversible affixed to the pallet 600 may comprise mounting points 710 forming one or more receptacles in accordance with the female component 200 of the reversible joints 10 of the present disclosure. Such mounting points 710 may be positioned in a pattern aligned with the connection points 610 of the pallet 600. The connection points 610 on the pallet 600 and the one or more mounting points 710 on the payload 700 allow the payload 700 to be positioned at numerous positions across a face of the pallet 600.

In one or more embodiments, the connection points 610 disposed on the pallet 600 may comprise a receptacle in accordance with the female component 200 of the reversible joints 10 of the present disclosure. In such embodiments, the payload 700 which is configured to be reversible affixed to the pallet 600 may comprise mounting points 710 comprising one or more rigid studs 110 in accordance with the male component 100 of the reversible joints 10 of the present disclosure. Such mounting points 710 may be positioned in a pattern aligned with the connection points 610 of the pallet 600. The connection points 610 on the pallet 600 and the one or more mounting points 710 on the payload 700 allow the payload 700 to be positioned at numerous positions across a face of the pallet 600.

In various embodiments, the mounting points 710 of the payload 700 may interface with 1 connection point 610, 2 connection points 610, 4 connection points 610, 6 connection points 610, 8 connection points 610, 9 connection points 610, 1 to 25 connection points 610, 1 to 16 connection points 610, 1 to 9 connection point 610s, or 1 to 4 connection points 610 disposed on the pallet 600. It will be appreciated that the quantity of connections between the connection points 610 of the pallet 600 and mounting points 710 of the payload 700 utilized may be selected to account for the dimensions of the payload 700 and the anticipated forces expected to be placed on the connections. In one or more embodiments, the mounting points 710 of the payload 700 may only interface with a subset of the connection points 610 aligned with the pallet 600. For example, the mounting points 710 may only interface with ever other connection point 610, every third connection point 610, or only connection points 610 aligned with the periphery of the payload 700. Such arrangement, may be selected to achieve sufficient connection between the pallet 600 and the payload 700 while reducing the number of connections and associated time and labor required to obtain connection of the reversible joints 10.

In one or more embodiments, the connection points 610 of the pallet 600 may form a continuous grid across the face of the pallet 600 to provide a multitude of potential connection locations for a payload 700. In further embodiments, the connection points 610 of the pallet 600 may be provided in interspersed groupings at defined positions to align with preselected payloads 700. Such interspersed groupings allow for placement and positioning of known payloads 700 without incurring needless manufacturing costs and efforts for unutilized connection points 610.

The payload 700 is generally not limited to certain structures. The payload 700 may comprise any structure which may be desired to be affixed to a base structure. In one or more embodiments, the trusses as previously disclosed may form the payload 700 and be affixed to a pallet 600. In further, embodiments, the payload 700 may comprise a box structure housing other components. For example, the payload 700 may comprise a case housing a scientific experiment, electronic modules, sensors, or other hardware desirously affixed to a space vehicle positioned in space. Additionally, the payload 700 may comprise a case housing equipment used in a terrestrial setting such as modules affixed to a communications tower.

The load bearing assembly 20 may be formed by joining together a plurality of the modular structures 300 in a sequential process for both capture and locking phases. In one or more embodiments, all or a sub-set of the reversible joints 10 present in the load bearing assembly 20 may be preliminarily connected with positioning in the capture phase. It will be appreciated that when the reversible joint 10 is in the capture phase limited range of motion is retained enabling for minor adjustments to the positioning of the modular structures 300 to sequentially align the male component 100 and the female component 200 of each progressive reversible joint 10 when assembling the load bearing assembly 20. Subsequent to connecting the desired reversible joints 10 into the capture phase, each reversible joint 10 may be progressed to the locking phase for firm securing of the reversible joint 10. Such process may be repeated to expand the load bearing assembly 20 to include additional modular structures 300.

Having described embodiments of the load bearing assembly 20 comprising modular structures 300 connected with one or more of the reversible joints 10 of the present disclosure, attention is drawn to disclosure of installation tools 900 for assembling the same. As previously indicated, the reversible joints 10 comprise a male component 100 and a female component 200 where activation of the polymer sleeve 220 in the female component 200 allows the male component 100 to be reversible secured within the female component 200. As such, the installation tools 900 must comprise systems to activate the polymer sleeve 220 of the female component 200 to ready the reversible joint 10 for assembly as well as properly position and engage the male component 100 and female component 200 during assembly operations. Such installation tools 900 and the associated systems supporting assembly operations are provided in more detail and with regards to the various disclosed modular structures 300.

Figure 8:
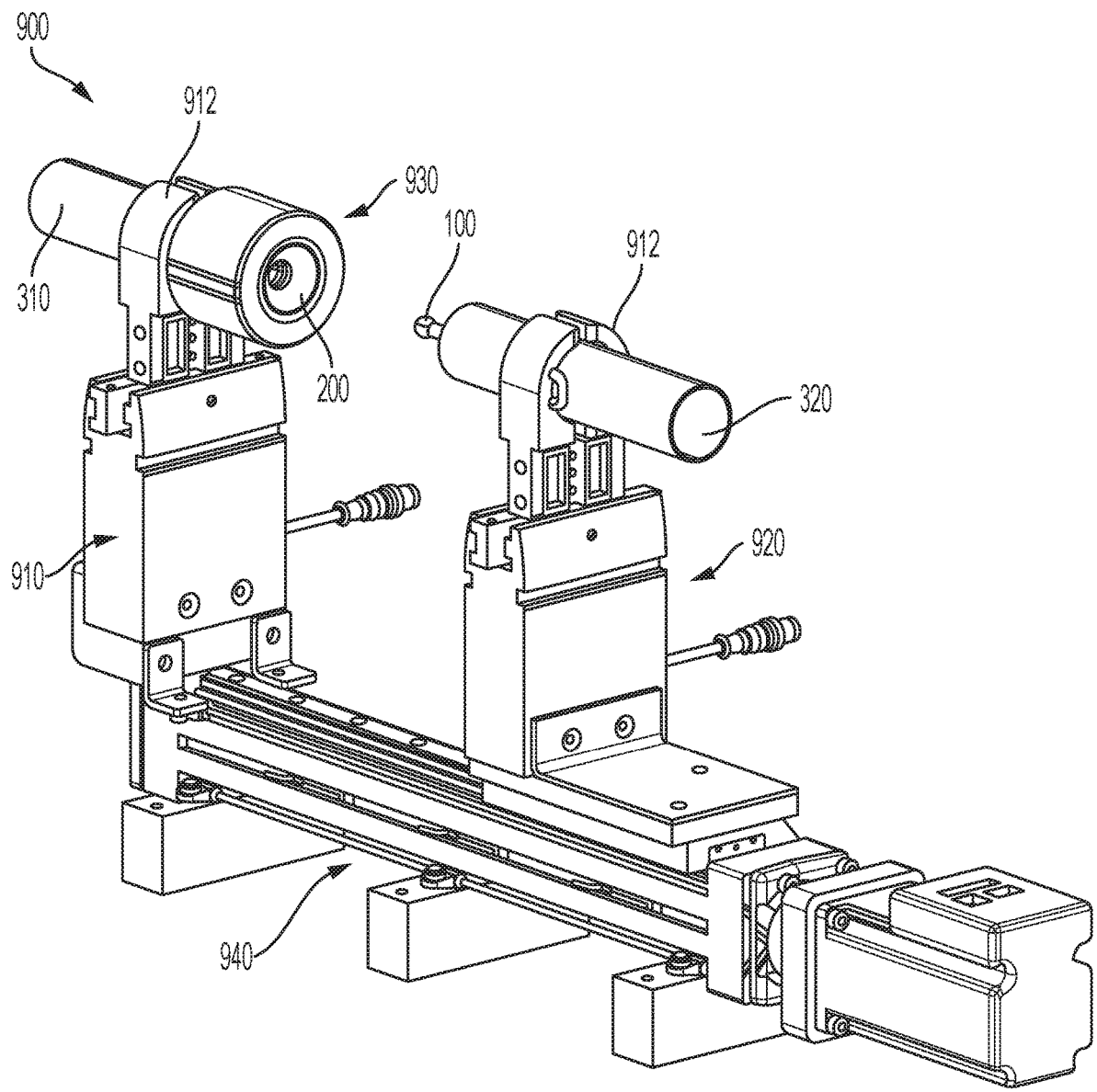
FIG. 8 schematically depicts an installation tool, according to one or more embodiments shown or described herein.

In one or more embodiments, an installation tool 900 for assembling a load bearing assembly 20 comprising modular structures 300 or trusses is provided. The modular structures 300 may include reversible joints 10 configured to join the modular structures 300 with the male component 100 disposed on a first modular structure 310 and the female component 200 disposed on a second modular structure 320 in an orientation to allow connection of the first modular structure 310 and the second modular structure 320 in a reversible manner. With reference to FIG. 8, the installation tool 900 may comprise a motorized first gripper 910 configured to capture the first modular structure 310, a second gripper 920 configured to capture the second modular structure 320, an induction coil 930 operable to power the embedded heating element 230 based on the principles of induction heating, and a motorized actuator 940 configured to controllably insert the rigid stud 110 of the male component 100 into the polymer based bushing 210 of the female component 200.

In one or more embodiments, the installation tool 900 includes the first gripper 910 and the second gripper 920, each gripper 910/920 configured to capture the components of the reversible joint 10 housing the male component 100 and the female component 200. The first gripper 910 and the second gripper 920 may comprise two or more jaws 912 matched to the exterior profile of truss members of the first modular structure 310 and the second modular structure 320 respectively. Such arrangement allows each of the first modular structure 310 and the second modular structure 320 to be captured by the first gripper 910 and the second gripper 920 respectively and manipulated through space to join the male component 100 and the female component 200 of the reversible joint 10. In one or more embodiments, the first gripper 910 and the second gripper 920 comprise jaws 912 formed from two jaw elements which translate to increase a space between the jaw elements for a truss element of the modular structure 300 to be inserted and then translate in an opposite direction to decrease the space between the jaw elements to ensnare the modular structure 300. In a further embodiment, the first gripper 910 and the second gripper 920 may comprise jaws 912 formed from two or more jaw elements which are pivotally connected to allow the jaw elements to splay open for insertion of a truss element of the modular structure 300 and then reversible close to ensnare the modular structure 300. While specific examples of mechanisms for the first gripper 910 and second gripper 920 are provided, it will be appreciated that additional gripping systems as known to those skilled in the art may equally be utilized.

The induction coil 930 powers the embedded heating element 230 of the reversible joint 10. It will be appreciated that induction heating is the process of heating an electrically conducting object by electromagnetic induction, through heat generated in the object by eddy currents. A rapidly alternating magnetic field generated by the induction coil 930 generates electric currents called eddy currents inside the embedded heating element 230. The eddy currents flowing through the resistance of the material forming the embedded heating element 230 heats it by Joule heating. Further, in ferromagnetic and ferrimagnetic materials such as those of embodiments of the embedded heating element 230, heat may also be generated by magnetic hysteresis losses.

Figure 9A:
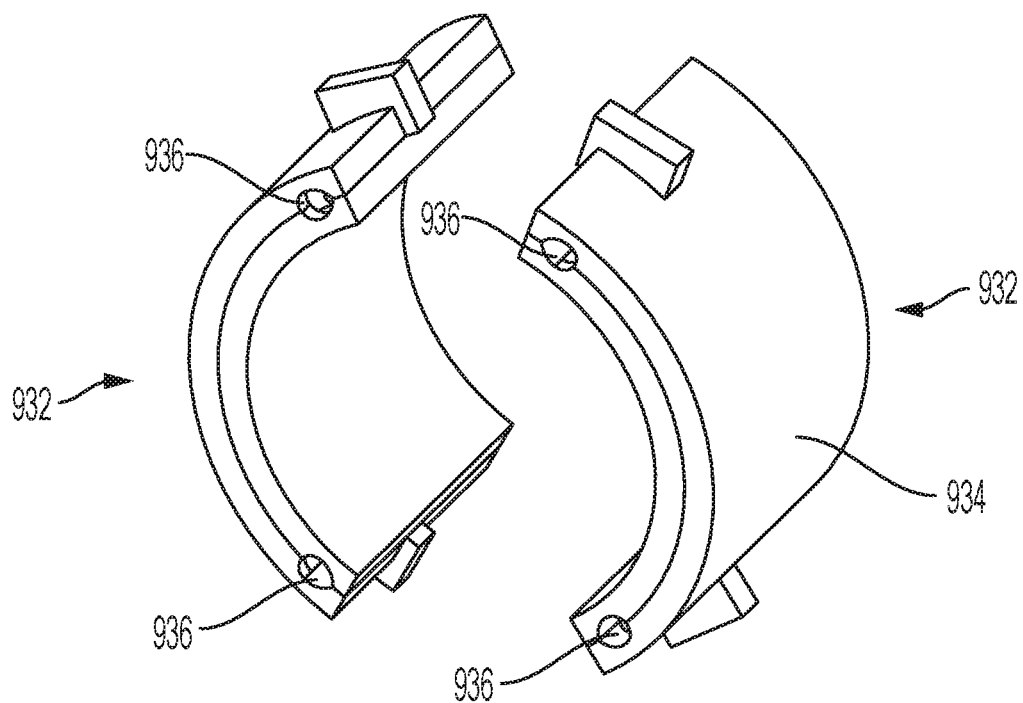
FIG. 9A schematically depicts a split induction coil in a housing shell, according to one or more embodiments shown or described herein.
Figure 9B:
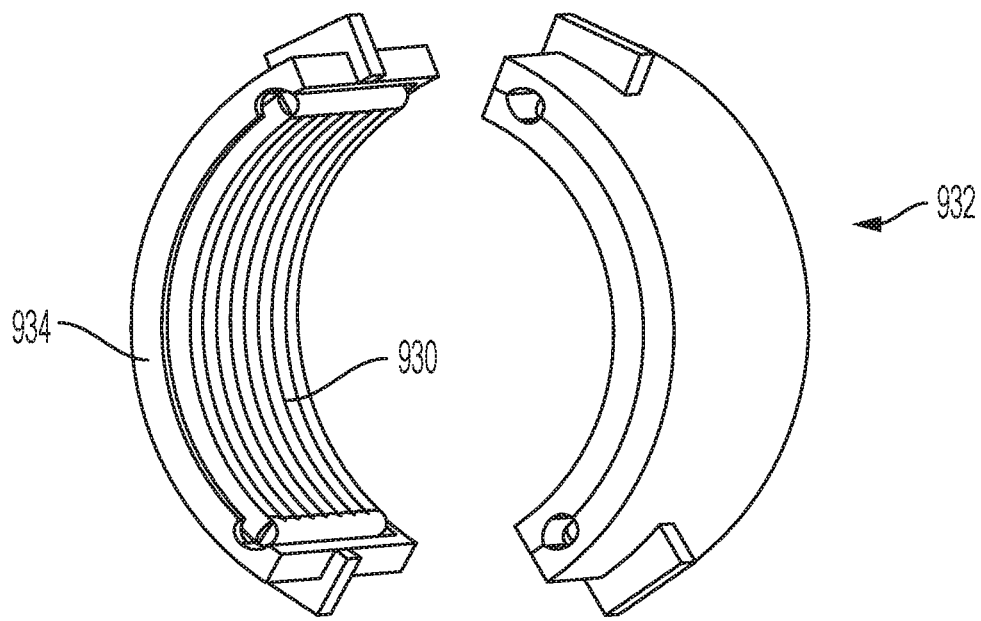
FIG. 9B schematically depicts the split induction coil of FIG. 9A with the housing shell partially removed.

In one or more embodiments and with reference to FIGS. 9A and 9B, the induction coil 930 is split into two or more elements such that the induction coil 930 is operable to separate for clamping of the induction coil 930 over the female component 200 of the reversible joint 10 of the modular structure 300. The split design of the induction coil 930 allows the induction coil 930 to be placed and removed from the reversible joint 10 as it will be appreciated that upon engagement of two components with the reversible joint 10 an induction coil 930 comprising a unitary ring would be trapped and incapable of sliding off.

Figure 9D:
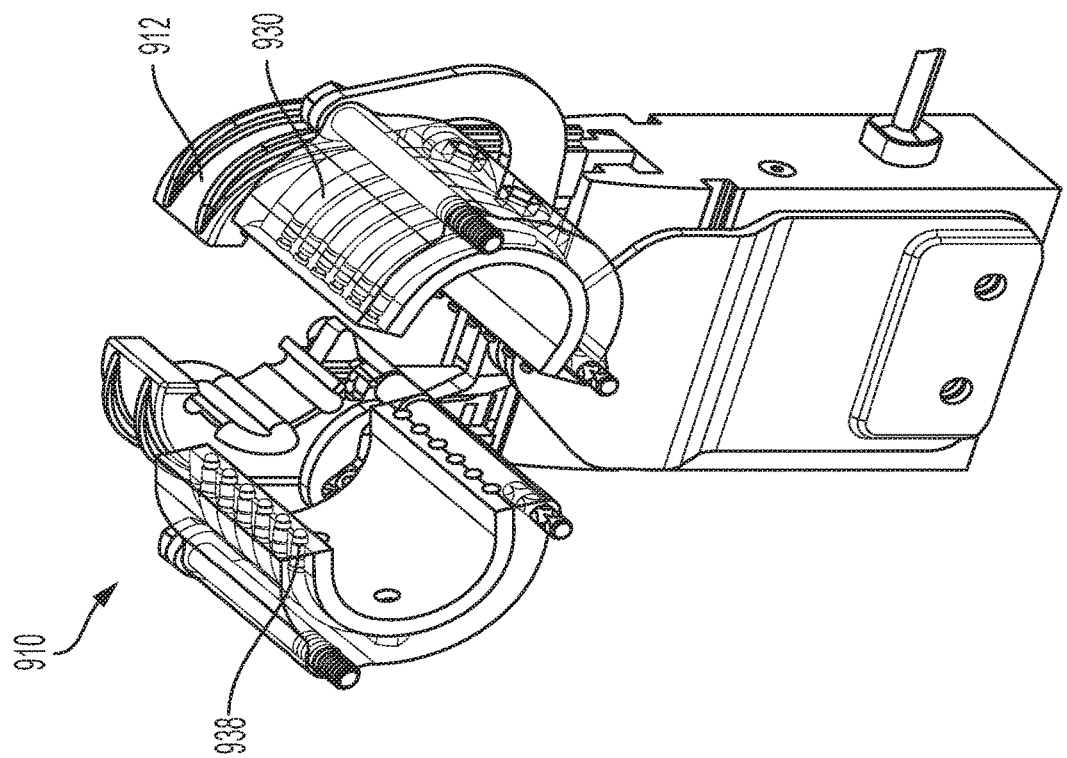
FIG. 9D schematically depicts the split induction coil of FIG. 9C in an open position, according to one or more embodiments shown or described herein.
Figure 9C:
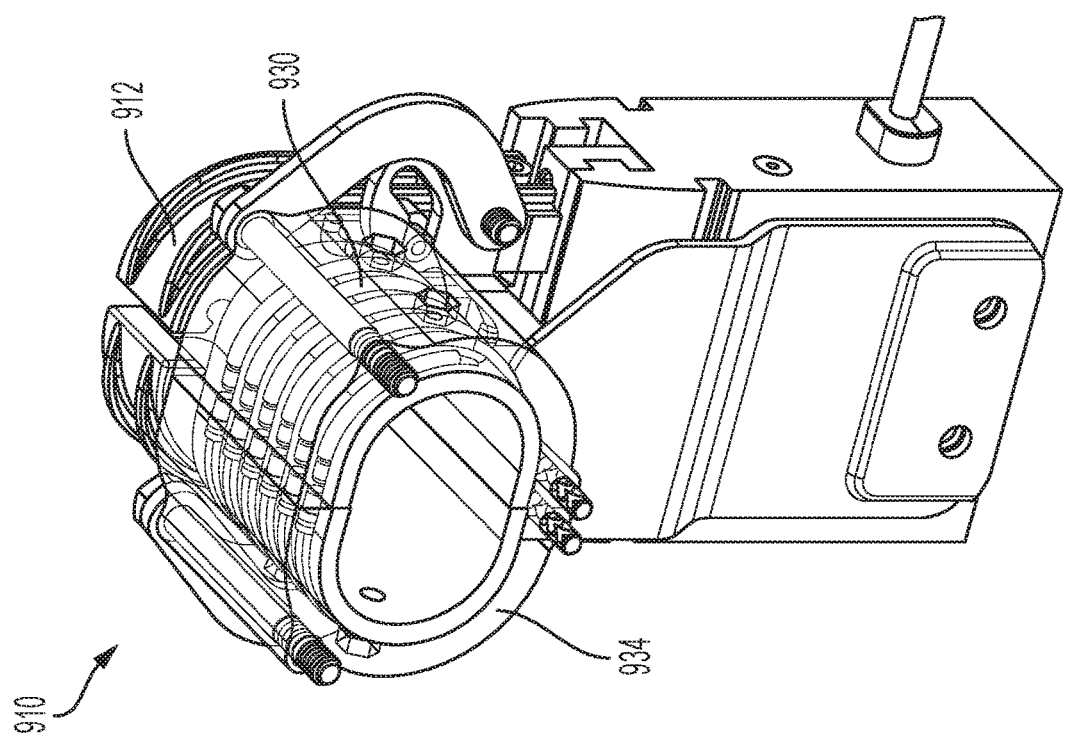
FIG. 9C schematically depicts a split induction coil in a closed position as part of an installation tool, according to one or more embodiments shown or described herein.

In one or more embodiments, the induction coil 930 may comprise two or more partial coils 932 joined together to form the complete induction coil 930. For example and with reference to FIGS. 9C and 9D, in the case of two partial coils 932, each would form half the complete induction coil 930 and represent approximately 180 degrees of the complete revolution. The partial coils 932 may be physically or electrically joined together to form a single complete induction coil 930 upon connection. Electrical joining of multiple, separate induction coil segments provided as the two partial coils 932 may be accomplished utilizing compliant electrical contacts 938, such as spring-loaded tabs or pogo-pins, at the ends of each coil turn. In further embodiments, the partial coils 932 may be not physically connected, but instead configured to simulated the electromagnetic properties of a complete induction coil 930. Specifically, the electric current flowing through the partial coils 932 may be synchronized to generate a magnetic field to inductively heat the embedded heating element 230.

In one or more embodiments, the partial coils 932 may be disposed in a housing shell 934 to isolate and protect the partial coils 932. The housing shell 934 may include access holes 936 for connection of positive and negative leads to the partial coils 932 for their activation.

In one or more embodiments, the partial coils 932 of the induction coil 930 may be affixed to the jaws 912 of the second gripper 920 such that operation of the second gripper 920 to engage the modular structure 300 concurrently positions and encloses the induction coil 930 around the embedded heating element 230.

In one or more embodiments, the individual coils forming the induction coil 930 may be stacked to increase the length of coil in the provided footprint. For example, the coils can be stacked along the length of the polymer-based bushing 210 or may be stacked in a concentric manner around the embedded heating element 230.

The motorized actuator 940 controllably inserts the rigid stud 110 of the male component 100 into the polymer based bushing 210 of the female component 200 and joins the components of the reversible joint 10. In one or more embodiments, the motorized actuator 940 controllably moves one or both of the first gripper 910 and the second gripper 920 to guide the rigid stud 110 into the polymer-based bushing 210. As the first gripper 910 and the second gripper 920 may be positioned to naturally align the male component 100 and the female component 200 of the reversible joint 10, the motorized actuator 940 may be provided as a linear actuator which draws the first gripper 910 and the second gripper together 920. It will be appreciated that one or both of the first gripper 910 and the second gripper 920 may be attached to the motorized actuator 940 with 1 or more degrees of freedom to allow the positioning of first gripper 910 and the second gripper 920 to be adjusted for fine tuning of the alignment of the male component 100 and female component 200 of the reversible joint 10 during connection.

In one or more embodiments, the installation tool 900 further comprises a temperature sensor (now shown) to measure the temperature of the shape memory polymer or shape memory polymer composite during induction heating of the embedded heating element 230. Monitoring of the temperature allows for determination of when the shape memory polymer or shape memory polymer composite is activated and in a condition for insertion of the rigid stud 110 into the polymer-based bushing 210 and connection of the reversible joint 10. Further, monitoring of the temperature alleviates concern with overheating the shape memory polymer or shape memory polymer composite as the induction coil 930 may be throttled to regulate heating. In various embodiments, the temperature sensor may be an infrared temperature sensor, a thermocouple embedded in the polymer-based bushing, a resistor temperature detector (RTD), a thermistor, or other temperature sensor as known to those skilled in the art.

In operation, the installation tool 900 may connect two components according to the mechanism illustrated in FIGS. 10A through 10G. Specifically, the first gripper 910 may engage with the first modular structure 310 which comprises the male component 100 of the reversible joint 10 and the second gripper 320 may engage with the second modular structure 320 which comprises the female component 200 of the reversible joint 10. Locating the second modular structure 320 and engaging the same with the second gripper 920 is illustrated in FIGS. 10A and 10C respectively. Concurrent with engagement of the second gripper 920, the induction coil 930 may be positioned around the embedded heater 230. Similarly, locating the first modular structure 310 and engaging the same with the first gripper 910 is illustrated in FIGS. 10B and 10D respectively. Once both components of the reversible joint 10 are engaged with the grippers 910/920 of the installation tool 900, the induction coil 930 may be activated to heat the embedded heating element 230. Once the polymer sleeve 220 is activated, the motorized actuator 940 draws the first modular structure 310 and the second modular structure 320 together to engage the male component 100 and the female component 200 in a capture phase where the components are connected but retain limited relative movement as illustrated in FIG. 10E. The process is repeated for additional tubular members 400 of the first modular structure 310 and the second modular structure 320 to locate all the reversible joints 10 in the capture phase before drawing the first modular structure 310 and the second modular structure 320 further together into the fully-seated and locked phase as illustrated in FIG. 10F. Upon engagement in the lock phase, the induction coil 930 is deactivated allowing the polymer sleeve 220 to cool and deactivate and return to a rigid state. A proof load may be introduced by the motorized actuator 940 to verify engagement and rigidity of the reversible joint. The proof load may comprise reversing the actuator 940 to apply a pulling force attempting to separate the reversible joint 10. Finally, the first gripper 910 and the second gripper 920 may be opened along with the induction coil 930 to release the load bearing assembly 20 as illustrated in FIG. 10G.

In embodiments with payloads 700 connected to a pallet 600 and with reference to FIG. 7, the installation tool 900 may comprise a multi-jointed arm 950 with a payload gripper 960 disposed at the end of the arm 950 for engagement of the payload 700 during installation. The multi-jointed arm 950 allows the payload 700 to be controllably positioned along an x-axis, a y-axis, and a z-axis to align the connection points 610 of the pallet 600 with the mounting points 710 of the payload 700.

Figure 11:
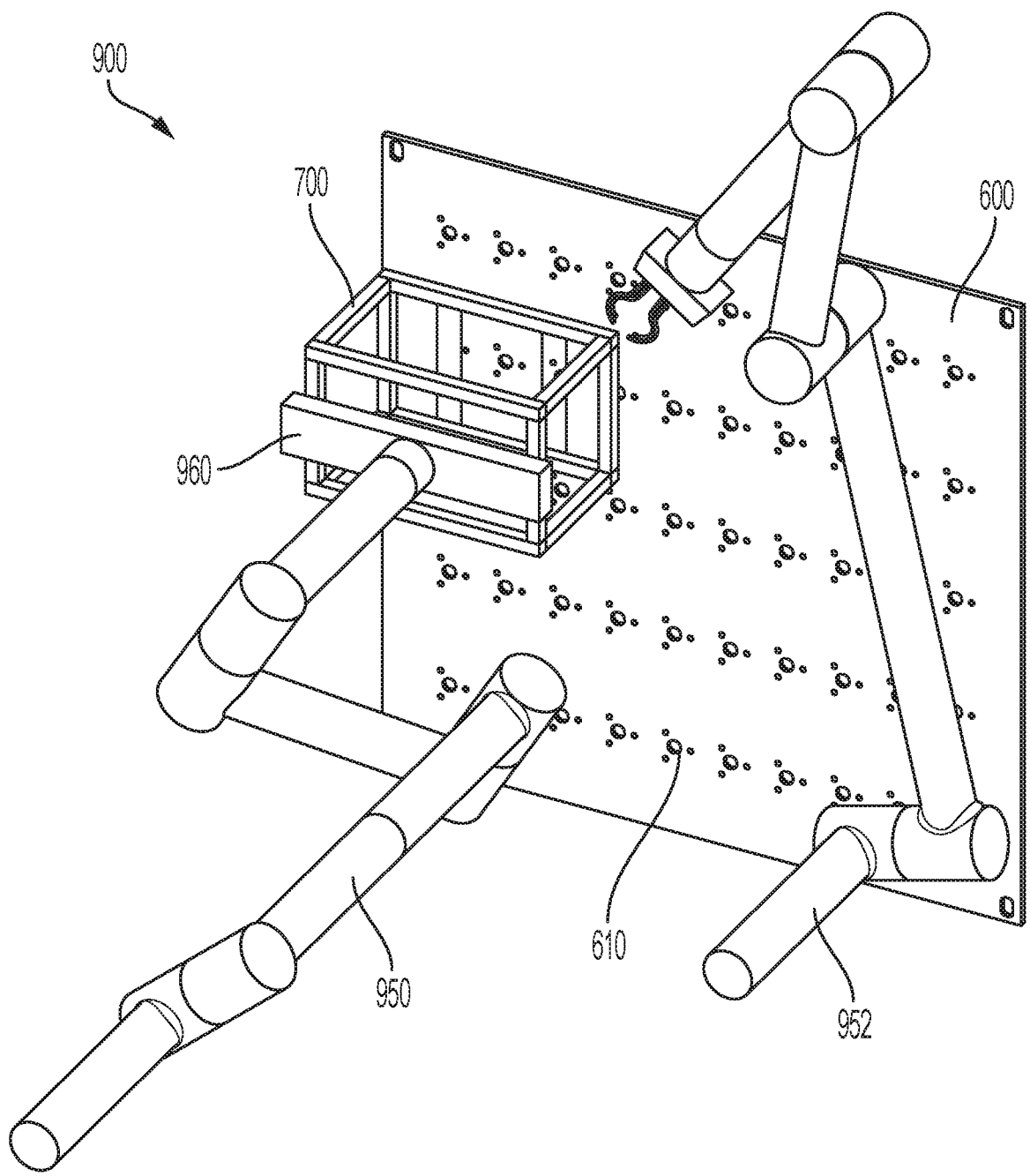
FIG. 11 schematically depicts placement of a payload to a pallet, according to one or more embodiments shown or described herein.
Figure 12:
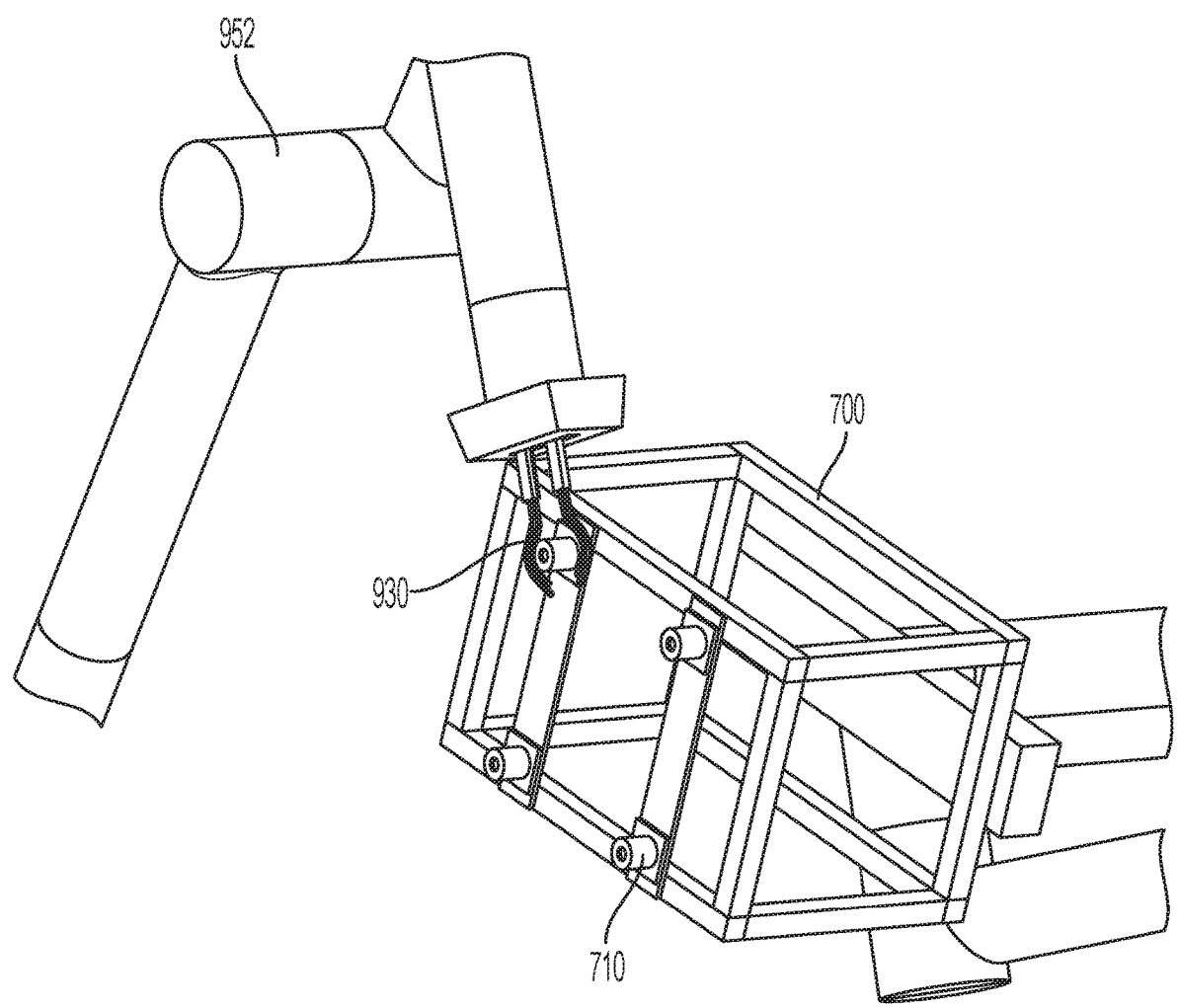
FIG. 12 schematically depicts activation of a connection point on a pallet, according to one or more embodiments shown or described herein.

In one or more embodiments and with reference to FIGS. 11 and 12, a second multi-jointed arm 952 is provided with an induction coil 930 disposed at the end of the second multi-jointed arm 952 for activation of the polymer sleeve 220 in combination with the embedded heating element 230. The induction coil 930 may be provided in accordance with the various arrangements previously disclosed. For example, the induction coil 930 may be split into two or more elements such that the induction coil 930 is operable to separate for clamping of the induction coil 930 over the embedded heating element 230. It will be appreciated that in various embodiments, the embedded heating element 230 may be provided in the mounting point 710 of the payload 700 or the connection points 610 of the pallet 600 depending on the arrangement of the male component 100 and female component 200 of the reversible joint 10. In various embodiments, the individual coils forming the induction coil 930 may be stacked along the length of the polymer-based bushing 210 or may be stacked in a concentric manner surrounding the embedded heating element 230.

In one or more embodiments and with reference to FIG. 13, a static induction coil 970 may be provided in the female component 200 of the reversible joint 100. For example, if the mounting point 710 of the payload 700 is the female component 200 of the formed reversible joint 10, the static induction coil 970 may be encased in or affixed to the mounting point 710. Similarly, if the connection point 610 of the pallet 600 is the female component 200 of the formed reversible joint 10, the static induction coil 970 may be encased in or affixed to the connection point 610. The provision of a static induction coil 970 removes the need to position a removable induction coil 930 around the embedded heating element 230 during installation operations. Instead the static induction coil 970 may be powered through connection to an electric source.

Figure 14A:
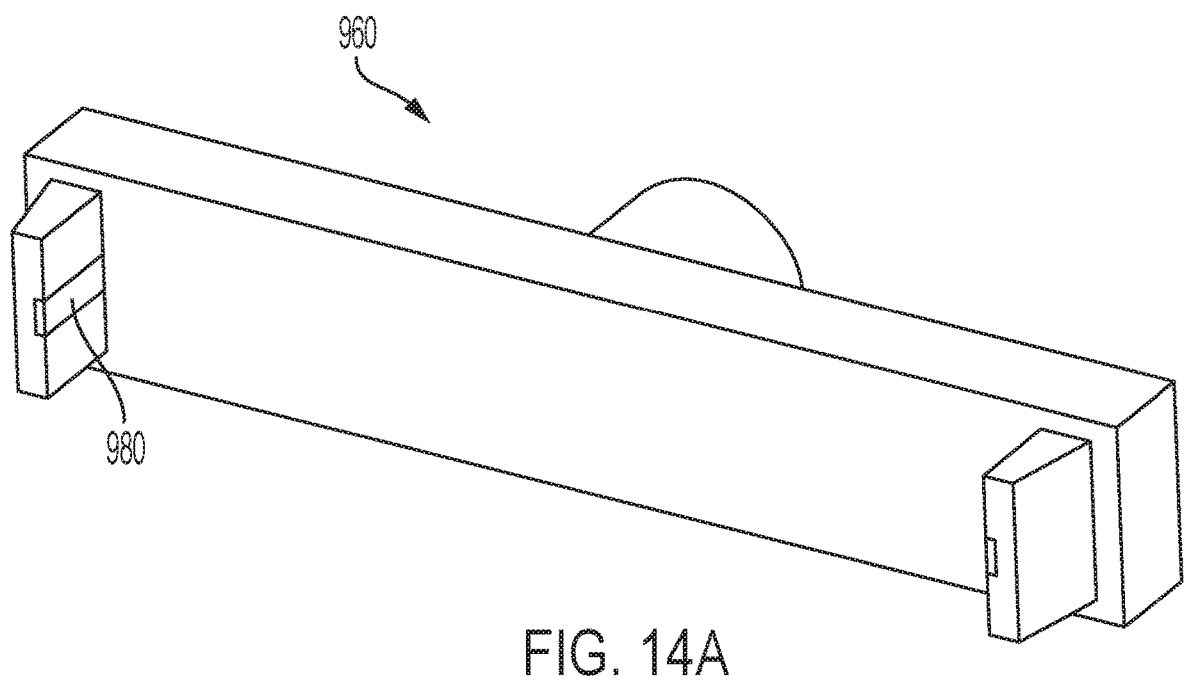
FIG. 14A schematically depicts a payload gripper, according to one or more embodiments shown or described herein.
Figure 14B:
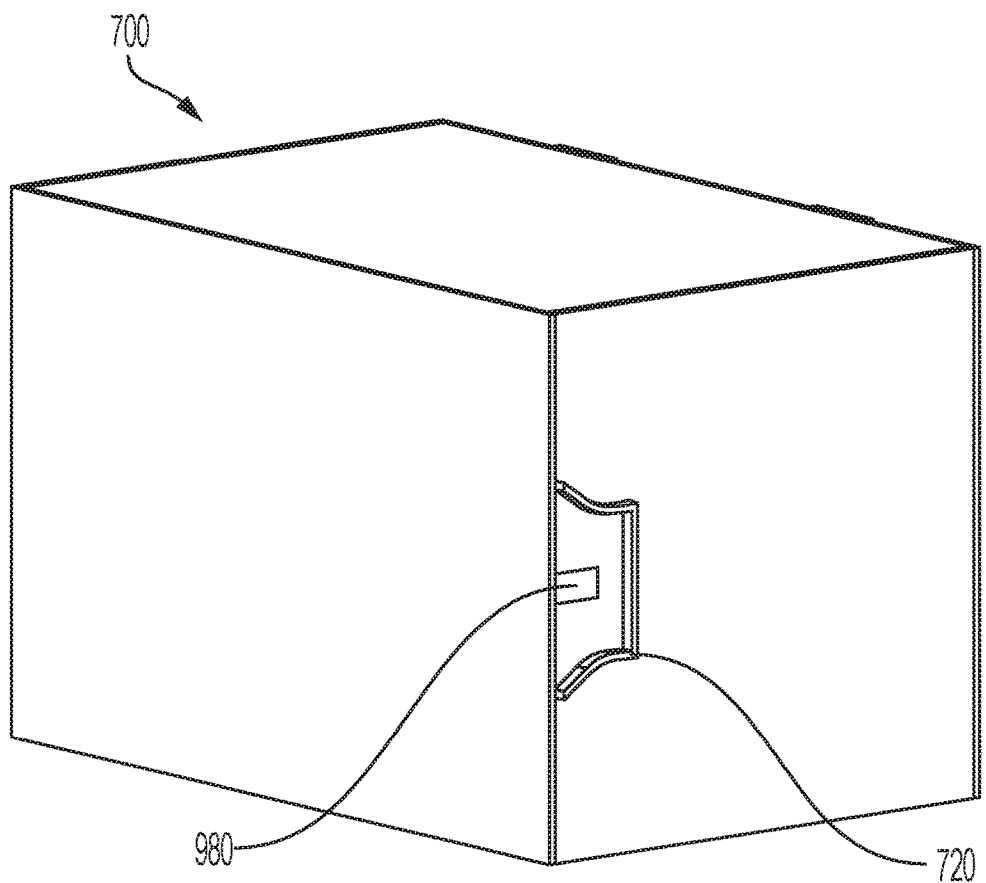
FIG. 14B schematically depicts a payload with electrical contacts, according to one or more embodiments shown or described herein.

With reference to FIGS. 14A and 14B, in embodiments with the static induction coil 970 housed in each mounting point 710 of the payload 700, the multi-jointed arm 950 with the payload gripper 960 may further comprise electrical contacts 980 disposed on the gripper 960 and the payload 700 to form an electrical connection between the payload gripper 960 and the payload 700. Further, the payload 700 may comprise a gripper aligner 720 configured to guide and the payload gripper 960 such that the electrical contacts 980 are aligned. The gripper aligner 720 includes flared guides to force minor adjustments in the positioning between the payload gripper 960 and the payload 700 when they are being connected. The electrical connections may be operable to power the static induction coils 970 of the mounting points 710 of the payload 700. Additionally, the electrical connections may be operable to carry data transmissions. In various embodiments, the mounting points 710 may be concurrently heated to activate the polymer sleeves 220 in a simultaneous manner or the heating of each mounting point 710 may be independently controlled to allow for activation of the polymer sleeves 220 in a serial or staged manner.

In embodiments with the static induction coil 970 housed in each connection point 610 of the pallet 600, the pallet 600 may further comprise an electrical connection with a power source. The electrical connection may be operable to power the static induction coils 970 of the connection points 610 of the pallet 600. In various embodiments, the connection points 610 may be concurrently heated to activate the polymer sleeves 220 in a simultaneous manner or the heating of each connection point 610 may be independently controlled to allow for activation of the polymer sleeves 220 in a serial or staged manner.

To demonstrate the effect of the shape memory polymer or shape memory polymer composite formulation on the mechanical properties associated with connecting and disconnecting the reversible joint as well as stability of the connected joint, polymer-based bushings of various composition were prepared. Specifically, polymer-based bushings were prepared using nonwoven carbon fiber mat to form Example 1, chopped carbon fiber to from Example 2, and neat resin to form Example 3. For each Example, the resin utilized to form the shape memory polymer was an epoxy resin.

Figure 15:
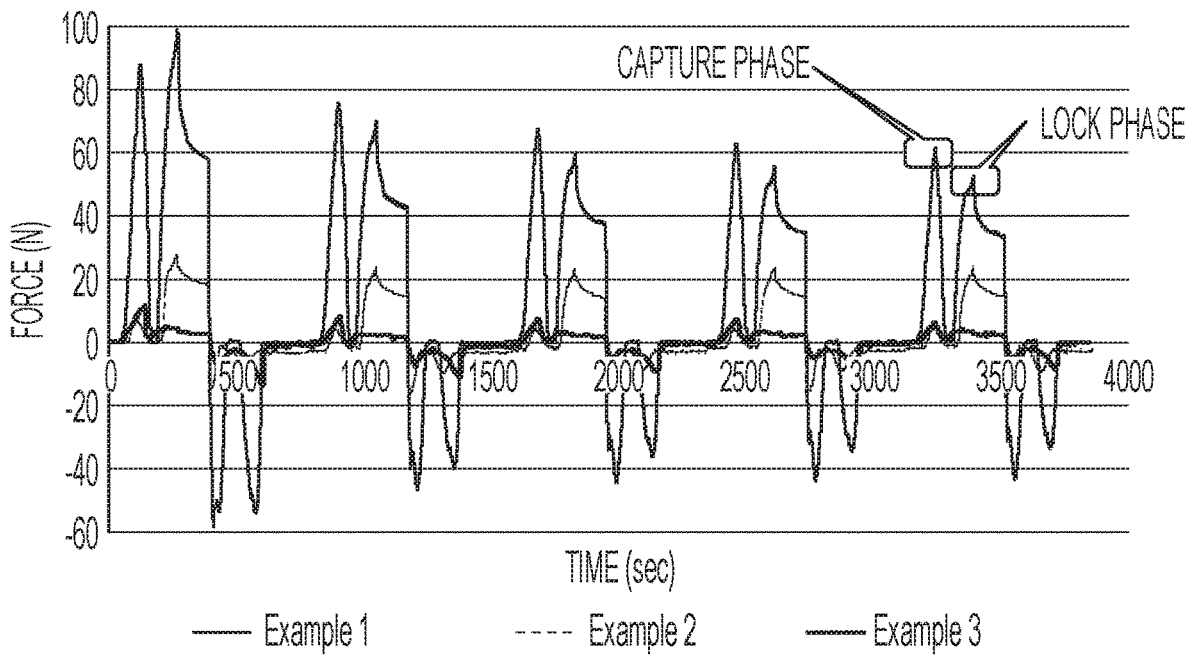
FIG. 15 graphically depicts cyclic attachment and detachment forces of example reversible joints in accordance with one or more embodiments shown or described herein.

Demonstration of repeatable cyclic attachment and detachment and defined capture and lock phases of the attachment was completed. Specifically, cyclic attachment and detachment of the Example joints was completed at a temperature of 130° C. as illustrated in FIG. 15. Regardless of the material used for the polymer-based bushing of the reversible joint, the data demonstrates show the presence of both the capture and lock phases. The variation of force between the attachment phases provide an opportunity for the installation tool to identify phase location during the assembly process. In addition, it can be seen that different material combinations provide different installation loads which may be advantageously exploited based on operational needs to generate a reversible joint with desired attachment and detachment forces. The maximum loads experienced by chopped carbon fiber (Example 2) is 28 N, neat resin (Example 3) is 11.5 N, and nonwoven carbon fiber (Example 1) is 99 N. Therefore, the attachment and detachment characteristics can be tailored through fiber orientation and loading of fillers (e.g. fibers and particulate), allowing for the ability tailor these forces if the application requires.

Figure 16:
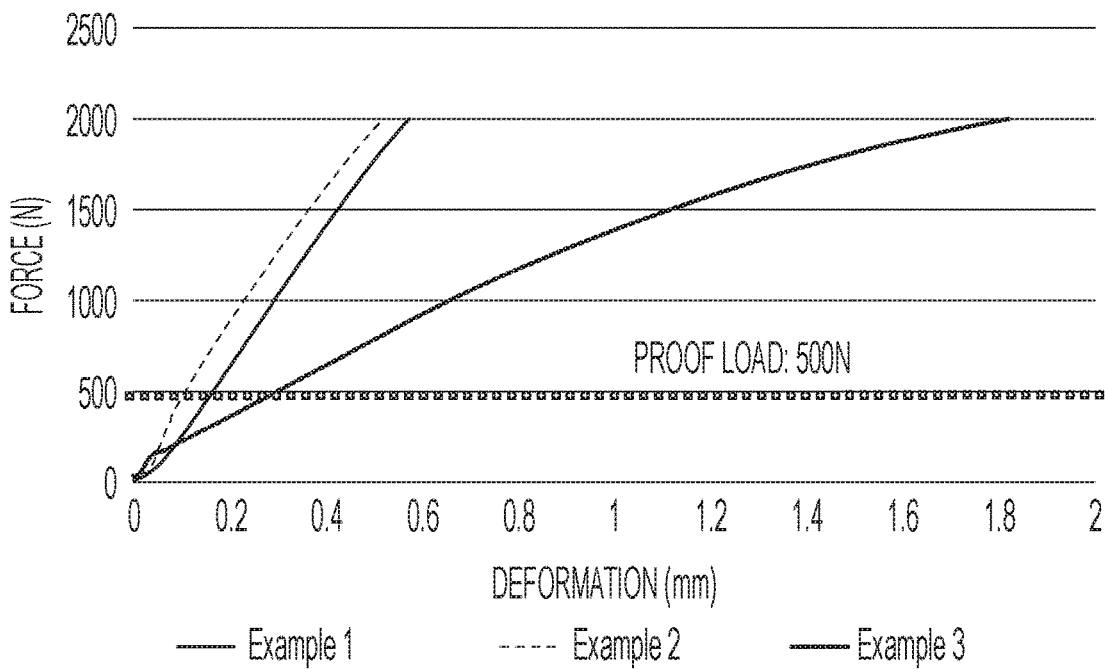
FIG. 16 graphically depicts axial tensile load behavior of example reversible joints in accordance with one or more embodiments shown or described herein.

Demonstration of the ultimate axial tensile load capacities of reversible joints formed in accordance to each of Example 1, Example 2, and Example 3 is illustrated in FIG. 16. An axial load was applied to each joint with a Universal Testing Machine (UTM) to measure deflection of the joint. Specifically, the test was completed by placing the reversible joint in tension with the UTM attempting to pull the rigid stud away from the joint. The test was terminated at a predetermined safety limit for applied force set on the instrument. The safety limit utilized in FIG. 16 was 2000 N resulting in each graphical trace terminating upon reaching a force of 2000 N. It can be seen that the neat resin joint (Example 3) deflected significantly more than the two carbon fiber composite-based joints (Examples 1 and 2). However, it is noted that at the 500 N proof load of all three materials exhibited a deflection of less than 0.3 mm, which demonstrate desirable stiffness at those loading conditions.

Figure 17:
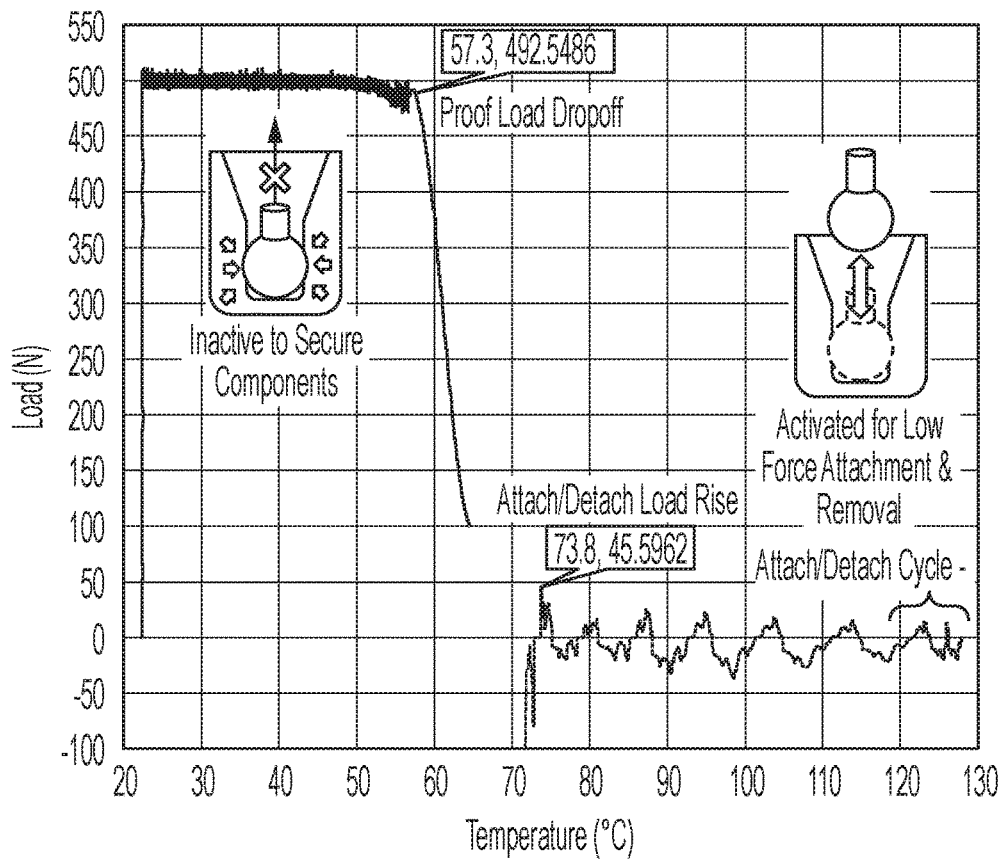
FIG. 17 graphically depicts effect of temperature on ultimate axial tensile load and attachment and detachment forces of an example reversible joint in accordance with one or more embodiments shown or described herein.

The effect of temperature on the attachment and detachment of the reversible joint as well as the engaged loading capacity was demonstrated as illustrated in FIG. 17. In an initial test, the effect of temperature on the proof load capacity was evaluated using a UTM programmed to maintain a quasi-static 500 N using a reversible joint fabricated with a SMP resin that has a glass transition temperature (Tg) in the range of 60° C. to 70° C. It is noted that the SMP resin was the same neat epoxy SMP resin utilized for Example 3. The testing demonstrated holding power of the reversible joint until proof load dropoff at 57.3° C. as the glass transition temperature of the SMP resin was approached. Utilizing a different testing procedure, the effect of temperature on installation and removal force was evaluated over multiple cycles at different temperatures. These results are also summarized in FIG. 17. The reversible low-force attachment and detachment is demonstrated as being preserved down to a temperature of approximately 74° C. when using this specific SMP resin formulation. Such observation is demonstrative of the low-force attachment and detachment being achieved at temperatures slightly beyond the upper bound of the glass transition temperature. It will be appreciated that other SMP resin, such as cyanate Ester SMP resins with glass transition temperatures ranging from −100° C. to 225° C. are also contemplated which can be utilized in application targeting specific in-space assembly mission requirements.

Figure 18:
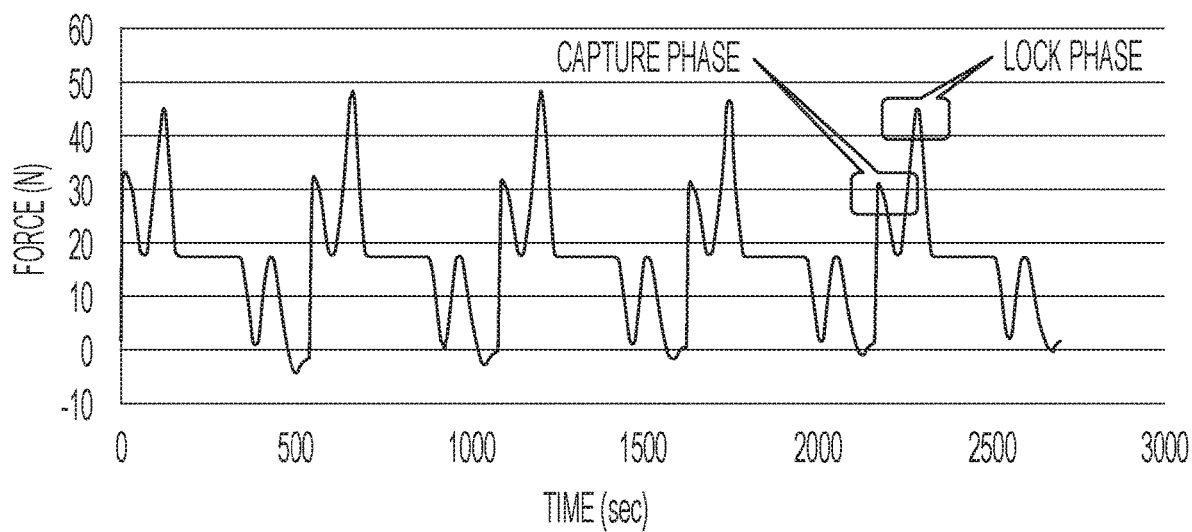
FIG. 18 graphically depicts applied force during multiple phases of attachment and detachment attachment and detachment of an example reversible joint in accordance with one or more embodiments shown or described herein.

As shown in FIG. 18, multiple attachment phases are present during the attachment and detachment cycle test while the SMP is activated. The variation of force between attachment phases provides a mechanism for the installation tool to identify which phase the reversible joint is in during the joining process. Of note, the insertion force is presently greater when the rigid stud enters the lock phase of the reversible joint compared to the capture phase. This is due to the rigid stud compressing a greater amount of material forming the polymer sleeve in the locking phase as opposed to the capture phase for the specified design. It will be appreciated that adjustments to the inner diameter or shaping of the head component of the rigid stud or changing the inner diameter or shaping of the polymer-based bushing to increase or decrease the interference between male/female geometries may adjust the balance of forces in the attachment and detachment of the reversible joint.

Having described various embodiments, it should be understood that the various aspects of the reversible joint, load bearing assemblies comprising modular structures joined with the reversible joints, and installation tools for assembling the same are described and such aspects may be utilized in conjunction with various other aspects.

In a first aspect, the disclosure provides a reversible joint, the reversible joint comprising a male component and a female component. The male component comprises a rigid stud, the rigid stud comprising a shaft region having a first width and a head region having a second width, the second width being greater than the first width. The female component comprises a polymer-based bushing, the polymer-based bushing comprising a polymer sleeve and an embedded heating element, wherein the embedded heating element is an induction heating element or a resistive heating element and the polymer sleeve comprises a shape memory polymer or a shape memory polymer composite material forming a central channel with a channel width less than the second width. The polymer-based bushing is capable of being activated by heating of the embedded heating element to reversibly change the polymer sleeve to become elastic to allow deformation of the central channel to an expanded channel width of at least the second width in an expanded region of the central channel during insertion of the head region of the male component therein, wherein the expanded region of the central channel returns to the channel width less than the second width upon passing of the head region of the male component through the expanded region and becomes rigid after deactivation of the polymer-based bushing for retention of the head region of the male component therein.\

In a second aspect, the disclosure provides the reversible joint of the first aspect, in which the embedded heating element is disposed within the polymer sleeve such that the polymer sleeve encapsulates the embedded induction heating element.

In a third aspect, the disclosure provides the reversible joint of the second aspect, in which the embedded heating element comprises a sheet of a conductive, ferromagnetic, or ferrimagnetic material encircling the central channel.

In a fourth aspect, the disclosure provides the reversible joint of any of the first through third aspects, in which the embedded heating element is an induction heating element which comprises ferromagnetic or ferrimagnetic materials comprising a Curie temperature 80 to 180° C. greater than an activation temperature of the shape memory polymer or the shape memory polymer composite material forming the polymer sleeve.

In a fifth aspect, the disclosure provides the reversible joint of the third aspect, in which the sheet of the conductive, ferromagnetic, or ferrimagnetic material forms a central ring with a plurality of arms extending from the central ring along a longitudinal length of the polymer sleeve.

In a sixth aspect, the disclosure provides the reversible joint of any of the first through fifth aspects, in which the polymer sleeve comprises one or more enlarged regions sized to accept the head region of the rigid stud without deformation of the polymer sleeve.

In a seventh aspect, the disclosure provides the reversible joint of any of the first through sixth aspects, in which the polymer sleeve comprises one or more annular cylinders or prisms formed from the shape memory polymer or the shape memory polymer composite material.

In an eighth aspect, the disclosure provides the reversible joint of the seventh aspect, in which the embedded heating element comprises one or more annular plates comprising conductive, ferromagnetic, or ferrimagnetic material, the annular plates positioned adjacent one or more faces of each of the annular cylinders or prisms of the polymer sleeve, wherein the annular plates comprise an annular plate aperture aligned with the central channel of the polymer sleeve and sized to allow free passage of the rigid stud therethrough.

In a ninth aspect, the disclosure provides the reversible joint of the seventh or eighth aspect, in which the female components further comprises one or more insulation rings positioned adjacent a front face, a back face, or both the front and the back face of the polymer-based bushing, the insulation rings comprising an insulation ring aperture aligned with the central channel of the polymer sleeve and sized to allow free passage of the rigid stub therethrough, wherein the insulation rings are configured to reduce transmission of heat generated by the embedded induction heating element away from the polymer-based bushing.

In a tenth aspect, the disclosure provides the reversible joint of any of the seventh through ninth aspects, in which the polymer based bushing comprises a split configuration with a first bushing comprising the one or more annular cylinders or prisms and the one or more annular plates in a sandwiched configuration and a second bushing comprising additional instances of the one or more annular cylinders or prisms and the one or more annular plates in a sandwiched configuration, wherein the first bushing and the second bushing are spaced apart with a gap provided therebetween sized to allow the head region of the rigid stud to be captured between the first bushing and the second bushing.

In an eleventh aspect, the disclosure provides the reversible joint of any of the first through tenth aspects, in which the head region of the rigid stud comprises a curved geometry.

In a twelfth aspect, the disclosure provides the reversible joint of the eleventh aspect, in which the head region of the rigid stud comprises a non-spherical geometry.

In a thirteenth aspect, the disclosure provides the reversible joint of the eleventh aspect, in which the head region of the rigid stud comprises a spherical geometry.

In a fourteenth aspect, the disclosure provides the reversible joint of any of the first through thirteenth aspects, in which the female component comprises a docking receptacle adjacent the polymer-based bushing, the docking receptacle comprising a central alignment aperture aligned with the central channel of the polymer sleeve and sized to allow free passage of the rigid stud therethrough, wherein the docking receptacle further comprises a beveled face such that the alignment aperture comprises a progressive reduction in cross-sectional area from a leading edge of the docking receptacle to a trailing edge affixed to the polymer-based bushing.

In a fifteenth aspect, the disclosure provides the reversible joint of the fourteenth aspect, in which the male component comprise a docking collar positioned on the shaft region of the rigid stud, the docking collar comprising a leading face having an inverse geometry to the beveled face of the docking receptacle.

In a sixteenth aspect, the disclosure provides the reversible joint of any of the first through fifteenth aspect, in which the shape memory polymer composite material comprises a shape memory polymer and carbon fiber.

In a seventeenth aspect, the disclosure provides the reversible joint of the sixteenth aspect, in which the carbon fiber comprises a nonwoven carbon fiber mat.

In an eighteenth aspect, the disclosure provides the reversible joint of the sixteenth aspect, in which the carbon fiber comprises a chopped carbon fiber having a weighted average length of 5 to 20 mm.

In a nineteenth aspect, the disclosure provides the reversible joint of any of the first through eighteenth aspect, in which the female component further comprises at least one electrically conductive coil component for inductively activating the polymer-based bushing.

In a twentieth aspect, the disclosure provides a load bearing assembly comprising modular structures. The modular structures comprise reversible joints in accordance with the reversible joint of any of the first through nineteenth aspects, in which the reversible joints are configured to join the modular structures. The reversible joints are configured with the male component disposed on a first modular structure and the female component disposed on a second modular structure in an orientation to allow connection of the first modular structure and the second modular structure in a reversible manner.

In a twenty-first aspect, the disclosure provides an installation tool for assembling a load bearing assembly in accordance with the twentieth aspect. The installation tool comprises a first gripper configured to capture the first modular truss, a second gripper configured to capture the second modular truss, an induction coil operable to power the embedded heating element, and a motorized actuator configured to controllably insert the rigid stud of the male component into the polymer based bushing of the female component.

In a twenty-second aspect, the disclosure provides the installation tool of the twenty-first aspect, in which the induction coil is split into two or more elements such that the induction coil is operable to separate for clamping of the induction coil over the second modular structure.

In a twenty-third aspect, the disclosure provides the installation tool of the twenty-first or twenty-second aspects, in which the installation tool further comprises a temperature sensor to measure the temperature of the shape memory polymer during inductive heating of the embedded heating element.

In a twenty-fourth aspect, the disclosure provides the installation tool of the twenty-third aspect, in which wherein the temperature sensor is an infrared temperature sensor.

In a twenty-fifth aspect, the disclosure provides the installation tool of any of the twenty-first through twenty-fourth aspects, in which the motorized actuator is a linear actuator.

As used throughout, the singular forms "a," "an" and "the" include plural referents unless the context clearly dictates otherwise. Thus, for example, reference to "a" component includes aspects having two or more such components, unless the context clearly indicates otherwise.

Optional or optionally means that the subsequently described event or circumstances may or may not occur. The description includes instances where the event or circumstance occurs and instances where it does not occur.

It is further noted that spatially oriented terms like "top", "bottom," and similar are not utilized herein to limit the scope of the claimed invention or to imply that certain special orientations are critical, essential, or even important to the structure or function of the claimed invention. Rather, these terms are merely intended to provide relative positions of components in a commonly understood manner.

It should be understood that any two quantitative values assigned to a property or measurement may constitute a range of that property or measurement, and all combinations of ranges formed from all stated quantitative values of a given property or measurement are contemplated in this disclosure.

As used here and in the appended claims, the words "comprise," "has," and "include" and all grammatical variations thereof are each intended to have an open, non-limiting meaning that does not exclude additional elements or steps.

Having described the subject matter of the present disclosure in detail and by reference to specific embodiments thereof, it is noted that the various details disclosed within should not be taken to imply that these details relate to elements that are essential components of the various embodiments described within, even in cases where a particular element is illustrated in each of the drawings that accompany the present description. Further, it should be apparent that modifications and variations are possible without departing from the scope of the present disclosure, including, but not limited to, embodiments defined in the appended claims. More specifically, although some aspects of the present disclosure are identified as particularly advantageous, it is contemplated that the present disclosure is not necessarily limited to these aspects.

What is claimed is:

1. A reversible joint, the reversible joint comprising a male component and a female component, wherein
    the male component comprises a rigid stud, the rigid stud comprising a shaft region having a first width and a head region having a second width, the second width being greater than the first width;
    the female component comprises a polymer-based bushing, the polymer-based bushing comprising a polymer sleeve and an embedded heating element, wherein the embedded heating element is an induction heating element or a resistive heating element and the polymer sleeve comprises a shape memory polymer or a shape memory polymer composite material forming a central channel with a channel width less than the second width; and
    the polymer-based bushing is capable of being activated by heating of the embedded heating element to reversibly change the polymer sleeve to become elastic to allow deformation of the central channel to an expanded channel width of at least the second width in an expanded region of the central channel during insertion of the head region of the male component therein, wherein the expanded region of the central channel returns to the channel width less than the second width upon passing of the head region of the male component through the expanded region and becomes rigid after deactivation of the polymer-based bushing for retention of the head region of the male component therein.

2. The reversible joint of claim 1, wherein the embedded heating element is disposed within the polymer sleeve such that the polymer sleeve encapsulates the embedded heating element.

3. The reversible joint of claim 2, wherein the embedded heating element comprises a sheet of a conductive, ferromagnetic, or ferrimagnetic material encircling the central channel.

4. The reversible joint of claim 3, wherein the sheet of the conductive, ferromagnetic, or ferrimagnetic material forms a central ring with a plurality of arms extending from the central ring along a longitudinal length of the polymer sleeve.

5. The reversible joint of claim 2, wherein the polymer sleeve comprises one or more enlarged regions sized to accept the head region of the rigid stud without deformation of the polymer sleeve.

6. The reversible joint of claim 1, wherein the embedded heating element is an induction heating element which comprises ferromagnetic or ferrimagnetic materials comprising a Curie temperature 80 to 180° C. greater than an activation temperature of the shape memory polymer or the shape memory polymer composite material forming the polymer sleeve.

7. The reversible joint of claim 1, wherein the polymer sleeve comprises one or more annular cylinders or prisms formed from the shape memory polymer or the shape memory polymer composite material.

8. The reversible joint of claim 7, wherein the embedded heating element comprises one or more annular plates comprising conductive, ferromagnetic, or ferrimagnetic material, the annular plates positioned adjacent one or more faces of each of the annular cylinders or prisms of the polymer sleeve, wherein the annular plates comprise an annular plate aperture aligned with the central channel of the polymer sleeve and sized to allow free passage of the rigid stud therethrough.

9. The reversible joint of claim 8, wherein the female component further comprises one or more insulation rings positioned adjacent a front face, a back face, or both a front and a back face of the polymer-based bushing, the one or more insulation rings comprising an insulation ring aperture aligned with the central channel of the polymer sleeve and sized to allow free passage of the rigid stud therethrough, wherein the one or more insulation rings are configured to reduce transmission of heat generated by the embedded induction heating element away from the polymer-based bushing.

10. The reversible joint of claim 8, wherein the polymer based bushing comprises a split configuration with a first bushing comprising the one or more annular cylinders or prisms and the one or more annular plates in a sandwiched configuration and a second bushing comprising additional instances of the one or more annular cylinders or prisms and the one or more annular plates in a sandwiched configuration, wherein the first bushing and the second bushing are spaced apart with a gap provided therebetween sized to allow the head region of the rigid stud to be captured between the first bushing and the second bushing.

11. The reversible joint of claim 1, wherein the head region of the rigid stud comprises a curved geometry.

12. The reversible joint of claim 11, wherein the head region of the rigid stud comprises a non-spherical geometry.

13. The reversible joint of claim 11, wherein the head region of the rigid stud comprises a spherical geometry.

14. The reversible joint of claim 1, wherein the female component comprises a docking receptacle adjacent the polymer-based bushing, the docking receptacle comprising a central alignment aperture aligned with the central channel of the polymer sleeve and sized to allow free passage of the rigid stud therethrough, wherein the docking receptacle further comprises a beveled face such that the alignment aperture comprises a progressive reduction in cross-sectional area from a leading edge of the docking receptacle to a trailing edge affixed to the polymer-based bushing.

15. The reversible joint of claim 14, wherein the male component comprise a docking collar positioned on the shaft region of the rigid stud, the docking collar comprising a leading face having an inverse geometry to the beveled face of the docking receptacle.

16. The reversible joint of claim 1, wherein the shape memory polymer composite material comprises a shape memory polymer and carbon fiber.

17. The reversible joint of claim 16, wherein the carbon fiber comprises a nonwoven carbon fiber mat.

18. A load bearing assembly comprising modular structures, the modular structures comprising reversible joints configured to join the modular structures, the reversible joints comprising a male component and a female component with the male component disposed on a first modular structure and the female component disposed on a second modular structure in an orientation to allow connection of the first modular structure and the second modular structure in a reversible manner, wherein the male component comprises a rigid stud, the rigid stud comprising a shaft region having a first width and a head region having a second width, the second width being greater than the first width;

the female component comprises a polymer-based bushing, the polymer-based bushing comprising a polymer sleeve and an embedded heating element, wherein the embedded heating element is an induction heating element or a resistive heating element and the polymer sleeve comprises a shape memory polymer or a shape memory polymer composite material forming a central channel with a channel width less than the second width; and the polymer-based bushing is capable of being activated by heating of the embedded heating element to reversibly change the polymer sleeve to become elastic to allow deformation of the central channel to an expanded channel width of at least the second width in an expanded region of the central channel during insertion of the head region of the male component therein, wherein the expanded region of the central channel returns to the channel width less than the second width upon passing of the head region of the male component through the expanded region and becomes rigid after deactivation of the polymer-based bushing for retention of the head region of the male component therein.

19. The load bearing assembly of claim 18, wherein the embedded heating element is an induction heating element and the female component further comprises at least one electrically conductive coil component for inductively activating the polymer-based bushing.

* * * * *